US010551081B1

(12) United States Patent
Miller-Russell

(10) Patent No.: US 10,551,081 B1
(45) Date of Patent: Feb. 4, 2020

(54) AIR CONDITIONER WITH SAFETY DEVICE

(71) Applicant: John Miller-Russell, Baltimore, MD (US)

(72) Inventor: John Miller-Russell, Baltimore, MD (US)

( * ) Notice: Subject to any disclaimer, the term of this patent is extended or adjusted under 35 U.S.C. 154(b) by 43 days.

(21) Appl. No.: 15/682,000

(22) Filed: Aug. 21, 2017

Related U.S. Application Data

(60) Provisional application No. 62/533,624, filed on Jul. 17, 2017.

(51) Int. Cl.
| | | |
|---|---|---|
| F24F 11/30 | (2018.01) | |
| F24F 11/32 | (2018.01) | |
| F24F 11/37 | (2018.01) | |
| F24F 11/83 | (2018.01) | |
| F24F 11/36 | (2018.01) | |
| F24F 11/58 | (2018.01) | |
| F24F 110/72 | (2018.01) | |

(52) U.S. Cl.
CPC .............. *F24F 11/30* (2018.01); *F24F 11/83* (2018.01); *F24F 11/36* (2018.01); *F24F 11/58* (2018.01); *F24F 2110/72* (2018.01)

(58) Field of Classification Search
CPC .......... F24F 13/222; F24F 11/30; F24F 11/32; F24F 11/36; F24F 11/37; F24F 11/58; F24F 2110/66; F24F 11/83; F24F 2110/72; F28D 21/14
USPC .................................. 165/11.1, 11.2; 62/115
See application file for complete search history.

(56) References Cited

U.S. PATENT DOCUMENTS

| | | | | | |
|---|---|---|---|---|---|
| 4,787,212 | A | * | 11/1988 | Hessey | .................... F24F 11/30 62/188 |
| 5,428,964 | A | * | 7/1995 | Lobdell | .................. G05D 27/02 62/176.6 |
| 5,457,963 | A | * | 10/1995 | Cahill-O'Brien | ...... A23B 7/148 62/78 |
| 5,522,229 | A | * | 6/1996 | Stuchlik, III | ............. E03C 1/28 62/127 |
| 5,749,234 | A | * | 5/1998 | Takano | ................. F25D 29/003 62/125 |
| 5,965,814 | A | * | 10/1999 | French | .................... F25D 21/02 73/304 R |
| 6,062,482 | A | * | 5/2000 | Gauthier | ............ G05D 23/1919 236/11 |
| 6,464,000 | B1 | * | 10/2002 | Kloster | ................. F24H 9/2085 165/247 |
| 7,177,534 | B2 | * | 2/2007 | Jones | .................... F24F 11/0009 219/494 |
| 8,452,457 | B2 | * | 5/2013 | Matsuoka | ........... H04L 12/2825 700/276 |
| 8,478,447 | B2 | * | 7/2013 | Fadell | ................ G05D 23/1902 700/278 |

(Continued)

FOREIGN PATENT DOCUMENTS

WO WO-2016151641 A1 * 9/2016 .............. F24F 11/89

*Primary Examiner* — Cassey D Bauer
*Assistant Examiner* — Kirstin U Oswald
(74) *Attorney, Agent, or Firm* — Garcia-Zamor Intellectual Property Law, LLC; Ruy Garcia-Zamor

(57) ABSTRACT

An air conditioning appliance having a safety device. The safety device preferably communicates with at least one sensor that is configured to detect an undesirable condition. If an undesirable condition is detected, then the operation of the air conditioning appliance can be modified as needed for safety.

8 Claims, 16 Drawing Sheets

(56) References Cited

U.S. PATENT DOCUMENTS

| | | | |
|---|---|---|---|
| 8,510,255 B2 * | 8/2013 | Fadell | G05B 15/02 706/52 |
| 8,511,577 B2 * | 8/2013 | Warren | G05D 23/1902 236/1 C |
| 8,532,827 B2 * | 9/2013 | Stefanski | G05D 23/1902 700/276 |
| 8,606,374 B2 * | 12/2013 | Fadell | G05D 23/1917 700/31 |
| 8,630,742 B1 * | 1/2014 | Stefanski | H05B 1/028 700/278 |
| 8,994,540 B2 * | 3/2015 | Fadell | H04L 12/6418 340/628 |
| RE45,574 E * | 6/2015 | Harter | G05D 23/1904 |
| 9,182,140 B2 * | 11/2015 | Kates | G05D 23/1934 |
| 9,189,751 B2 * | 11/2015 | Matsuoka | H04L 12/2829 |
| 9,285,802 B2 * | 3/2016 | Arensmeier | G05B 23/0224 |
| 9,298,196 B2 * | 3/2016 | Matsuoka | G05D 23/1904 |
| 9,298,197 B2 * | 3/2016 | Matsuoka | F24F 11/62 |
| 9,342,082 B2 * | 5/2016 | Guenette | G05B 15/02 |
| 9,535,408 B2 * | 1/2017 | Lingrey | G05B 15/02 |
| 10,101,050 B2 * | 10/2018 | Radovanovic | G05B 15/02 |
| 2002/0033759 A1 * | 3/2002 | Morello | G01M 3/18 340/605 |
| 2005/0138939 A1 * | 6/2005 | Spanger | F24F 13/222 62/150 |
| 2007/0000908 A1 * | 1/2007 | Bohan, Jr. | F24F 11/30 219/505 |
| 2009/0007578 A1 * | 1/2009 | Yabu | F24F 1/0003 62/190 |
| 2010/0064705 A1 * | 3/2010 | Chauvin | F04B 49/02 62/150 |
| 2013/0019961 A1 * | 1/2013 | Rogers | F24F 11/30 137/334 |
| 2014/0130529 A1 * | 5/2014 | Kaiser | B08B 9/032 62/150 |
| 2014/0137584 A1 * | 5/2014 | Kim | F25B 49/00 62/126 |
| 2014/0262130 A1 * | 9/2014 | Yenni | G05B 23/0216 165/11.1 |
| 2014/0262134 A1 * | 9/2014 | Arensmeier | F24D 19/1084 165/11.2 |
| 2016/0195294 A1 * | 7/2016 | Conner | G01R 31/00 236/1 C |
| 2016/0238266 A1 * | 8/2016 | O'Donnell | G05B 15/02 |
| 2017/0060150 A1 * | 3/2017 | Stefanski | G05D 23/27 |
| 2017/0167742 A1 * | 6/2017 | Radovanovic | G05B 15/02 |
| 2018/0283767 A1 * | 10/2018 | Conley | F24F 13/222 |

\* cited by examiner

AIR CONDITIONER WITH SAFETY DEVICE

CROSS REFERENCE TO RELATED APPLICATIONS

This application is a non-provisional of and claims priority and benefit of U.S. Provisional Patent Application No. 62/533,624, filed Jul. 17, 2017, which is hereby incorporated by reference herein as if fully set forth in its entirety.

BACKGROUND

The present invention is generally directed to air conditioning appliances and, more specifically, to an air conditioning appliance having an advanced safety feature.

Proper functioning of air conditioning appliances is very important especially since the actual units are out of immediate sight. This often occurs to floods, leaks of refrigerant, etc. which can result in the inability to properly condition air.

It may be advantageous to provide one of an air conditioning appliance and/or a first alert module that: enhances safety; is efficient to manufacture; can be retrofit into existing air conditioning appliances; and/or integrated into newer air conditioning appliances.

SUMMARY

Briefly speaking, one embodiment of the present invention is directed to an air conditioning system having an advanced safety feature including an air conditioning housing. The air conditioning system preferably includes: an evaporator configured to extract heat from surrounding air; a condenser configured to convert vapor to liquid; a compressor configured to increase the pressure of a gas; and a refrigerant configured to circulate throughout the air conditioning system. At least one of a drain pan and a P-Trap, formed by a drain pipe extending from the air conditioning housing, may be positioned under the air conditioning housing with a sensor disposed in the at least one of the drain pan and the P-Trap. The sensor may be configured to detect liquid. A controller in communication with the sensor and the air conditioning system may be included, the controller preferably including an alert module configured to send an alert if the sensor detects liquid. The alert may include one or more of a text message, a voice call, an email, or an audio alert through a wireless speaker. The controller preferably includes a bypass message module configured to receive a bypass message after the alert is generated and prior to the controller stopping operation of the air conditioning system. The controller preferably also includes an operation termination module configured to stop the operation of the air conditioning system if, after generating the alert, the bypass message module does not receive the bypass message within a predetermined amount of time and if the sensor still detects the liquid. The controller preferably further includes an override message module configured to restart operation of the air conditioning system after the operation termination module has stopped operation of the air conditioning system when an override message is received.

In another aspect, the present invention is directed to an air conditioning system having a sensor is disposed in at least one of a drain pan and a drain pipe. The sensor being configured to detect liquid. A controller is in communication with the sensor and the air conditioning system. The controller preferably includes an alert module configured to send an alert if the sensor detects the liquid. The alert is at least one of a text message, a voice call, an email, and an audio alert through a wireless speaker. The controller preferably includes a bypass message module configured to receive a bypass message after the alert is generated prior to the controller stopping operation of the air conditioning system. The controller preferably includes an operation termination module configured to stop operation of the air conditioning system if, after generating the alert, the bypass message module does not receive the bypass message within a predetermined amount of time and if the sensor still detects the liquid. The controller preferably includes an override message module configured to restart operation of the air conditioning system after the operation termination module has stopped operation of the air conditioning system when an override message is received.

In another aspect, the present invention is direct to a method of providing an air conditioning system with a safety feature, including the steps of: providing an air conditioner; and the user selecting a type of alert to be sent when an undesirable condition is detected. The type of alert being the at least one of the text message, the voice call, the email, and the audio alert through the wireless speaker.

In another aspect, the present invention is directed to a first alert module configured to alert a user of an undesirable condition in and/or caused by and/or related to an air conditioning appliance. The first alert module including a module controller configured to communicate with an air conditioning appliance. A sensor is disposed in at least one of a drain pan, a flue, a duct in communication with the air conditioner appliance, and a drain pipe of the air conditioner appliance. The module controller preferably includes an alert module configured to send an alert if the sensor detects an undesirable condition. The alert is at least one of a text message, a voice call, an email, and an audio alert through a wireless speaker. The module controller preferably includes a bypass message module configured to receive a bypass message after the alert is generated prior to the controller stopping operation of the air conditioning system. The module controller preferably includes an operation termination module configured to stop operation of the air conditioning system if, after generating the alert, the bypass message module does not receive the bypass message within a predetermined amount of time and if the sensor still detects the liquid. The module controller preferably includes an override message module configured to restart operation of the air conditioning system after the operation termination module has stopped operation of the air conditioning system when an override message is received.

In another aspect, the present invention is directed to a first alert module configured to alert a user of an undesirable condition in and/or caused by and/or related to an air conditioning appliance. The first alert module including a module controller configured to communicate with an air conditioning appliance. A sensor is disposed in at least one of a drain pan, a flue, a duct in communication with the air conditioner appliance, and a drain pipe of the air conditioner appliance. The module controller preferably includes an alert module configured to send an alert if the sensor detects an undesirable condition. The alert is at least one of a text message, a voice call, an email, and an audio alert through a wireless speaker. The module controller preferably includes a bypass message module configured to receive a bypass message after the alert is generated prior to the controller stopping operation of the air conditioning system. The module controller preferably includes an operation termination module configured to stop operation of the air conditioning system if, after generating the alert, the bypass message module does not receive the bypass message within a predetermined amount of time and if the sensor still detects the liquid.

In another aspect, the present invention is directed to a first alert module configured to alert a user of an undesirable condition in and/or caused by and/or related to an air conditioning appliance. The first alert module including a module controller configured to communicate with an air conditioning appliance. A sensor is disposed in at least one of a drain pan, a flue, a duct in communication with the air conditioner appliance, and a drain pipe of the air conditioner appliance. The module controller preferably includes an alert module configured to send an alert if the sensor detects an undesirable condition. The alert is preferably, but not necessarily, at least one of a text message, a voice call, an email, and an audio alert through a wireless speaker or the like (such as a smart home device or other portable electronics). The module controller preferably includes an operation termination module configured to stop operation of the air conditioning appliance if an alert is sent.

In another aspect, the present invention is directed to an air conditioning appliance having an advanced safety feature, including the air conditioning appliance being one of an air conditioner, a heat pump, a hot water heater, a steam pump, a hot water boiler and a geothermal system. A sensor is disposed in at least one of a drain pan, a flue, a duct in communication with the air conditioner appliance, and a drain pipe of the air conditioner appliance. A controller is in communication with the sensor and the air conditioning appliance. The controller preferably includes an alert module configured to send an alert if the sensor detects an undesirable condition. The alert is preferably, but not necessarily, at least one of a text message, a voice call, an email, and an audio alert through a wireless speaker. The controller preferably includes a bypass message module configured to receive a bypass message after the alert is generated prior to the controller stopping operation of the air conditioning appliance. The controller preferably includes an operation termination module configured to stop operation of the air conditioning appliance if, after generating the alert, the bypass message module does not receive the bypass message within a predetermined amount of time and if the sensor still detects the undesirable condition. The controller preferably includes an override message module configured to restart operation of the air conditioning appliance after the operation termination module has stopped operation of the air conditioning appliance when an override message is received.

In another aspect, the present invention is directed to a method of providing an air conditioning unit configured to alert a user of a liquid present in a drain pan or a drain pipe of the air conditioning unit. The method preferably includes the steps of: providing the air conditioning unit; configuring the air conditioning unit to include at least one of the drain pan thereunder and a P-Trap formed by the drain pipe extending from the air conditioning unit; providing a sensor in at least one of the drain pan and the drain pipe, the sensor being configured to detect the liquid; providing a controller in communication with the sensor and configured to stop operation of the air conditioning unit; sending an alert to the user if the sensor detects the liquid, wherein the alert is at least one of a text message, a voice call, an email, and an audio alert through a wireless speaker; monitoring by the controller for receipt of at least one of a bypass message and an override message after generation of the alert; and stopping operation of the air conditioning unit if, after generating the alert, the controller does not receive the bypass message within a predetermined amount of time and if the sensor still detects the liquid.

In another aspect, the present invention is directed to a method of providing an air conditioning unit configured to alert a user of a liquid present in a drain pan or a drain pipe of the air conditioning unit. The method preferably includes the steps of: providing the air conditioning unit; configuring the air conditioning unit to include at least one of the drain pan thereunder and a P-Trap formed by the drain pipe extending from the air conditioning unit; monitoring at least one of the drain pan and the drain pipe to detect the liquid; providing a controller in communication with the sensor and configured to stop operation of the air conditioning unit; sending an alert if liquid is detected; monitoring by the controller for receipt of at least one of a bypass message and an override message after generation of the alert; and stopping operation of the air conditioning unit if, after generating the alert, the controller does not receive the bypass message within a predetermined amount of time and if liquid is still detected.

In another aspect, the present invention is directed to air conditioning unit including an evaporator, a condenser, and a compressor. Either a drain pan is located under the air conditioner and/or a P-trap is formed by a drain pipe extending from the air conditioning unit. A sensor is in at least one of the drain pan and the drain pipe. The sensor is configured to detect a liquid. A controller is in communication with the sensor and is adapted to stop operation of the air conditioning unit. The controller is preferably configured to send an alert to a user if the sensor detects the liquid. The alert can be, but is not necessarily, at least one of a text message, a voice call, an email, and an audio alert through a wireless speaker. The controller is preferably configured to stop operation of the air conditioning unit if the sensor detects the liquid and a bypass message is not received within a predetermined amount of time after the sensor first detected the liquid.

In another aspect, the present invention is directed to a method of providing a first alert module configured to alert a user of an undesirable condition in and/or caused by and/or related to an air conditioning appliance. The method preferably includes the step of providing the air conditioning appliance; configuring the air conditioning appliance to include at least one of the drain pan thereunder and a P-Trap formed by the drain pipe extending from the air conditioning appliance; providing a sensor in at least one of the drain pan and the drain pipe, the sensor being configured to detect the liquid; providing a controller in communication with the sensor and configured to stop operation of the air conditioning appliance; sending an alert to the user if the sensor detects the liquid, wherein the alert is preferably, but not necessarily, at least one of a text message, a voice call, an email, and an audio alert through a wireless speaker; monitoring by the controller for receipt of at least one of a bypass message and an override message after generation of the alert; and stopping operation of the air conditioning appliance if, after generating the alert, the controller does not receive the bypass message within a predetermined amount of time and if the sensor still detects the liquid.

In another aspect, the present invention is directed to a method of providing first alert module configured to alert a user of an undesirable condition in and/or caused by and/or related to an air conditioning appliance. The method preferably includes the steps of: providing the air conditioning appliance; providing a sensor in at least one of a drain pan, a flue, a duct in communication with the air conditioner appliance, and a drain pipe, the sensor being configured to detect the undesirable condition; providing a controller in communication with the sensor and configured to stop operation of the air conditioning appliance; sending an alert to the user if the sensor detects the undesirable condition, wherein the alert is preferably, but not necessarily, at least one of a text message, a voice call, an email, an audio alert through an Echo dot, an audio alert via a smart home component, and an audio alert through a wireless speaker; monitoring by the controller for receipt of at least one of a bypass message and an override message after generation of the alert; and stopping operation of the air conditioning appliance if, after generating the alert, the controller does not receive the bypass message within a predetermined amount of time and if the sensor still detects the undesirable condition.

In another aspect, the present invention is directed to a method of retrofitting an air conditioning unit having an evaporator, a condenser, a compressor, and at least one of a drain pan and a drain pipe, the method preferably including the steps of: providing a wireless sensor in at least one of the drain pan and the drain pipe, the wireless sensor being configured to detect a liquid; providing a control module comprising a controller and an alert module, wherein the controller is in communication with the wireless sensor, the control module is further adapted to stop operation of the air conditioning unit; generating an alert to the user by the alert module if the wireless sensor detects the liquid, wherein the alert is at least one of a text message, a voice call, an email, and an audio alert through a wireless speaker; monitoring by the controller to determine whether at least one of a bypass message and an override message is received from the user; stopping the operation of the air conditioning unit if, after generating the alert, the controller does not receive the bypass message within a predetermined amount of time and if the wireless sensor still detects the liquid.

BRIEF DESCRIPTION OF THE DRAWINGS

The foregoing summary, as well as the following detailed description of the preferred embodiment of the present invention will be better understood when read in conjunction with the appended drawings. For the purpose of illustrating the invention, there are shown in the drawings an embodiment which is presently preferred. It is understood, however, that the invention is not limited to the precise arrangement and instrumentality shown. In the drawings:

FIG. 2 is a second perspective view of the first alert module 20 of FIG. 1. It is preferred that first axial end panel 36 include a plurality of ports 22. It is preferred that the second longitudinal side panel 42 include a plurality of lateral vents 26. The housing 24 preferably encloses first alert module controller 70. The first alert module controller 70 preferably includes an alert module 72, a bypass message module 74, and operation termination module 76, and an override message module 78. Those of ordinary skill in the art will appreciate from this disclosure that the multiple modules can be combined into a single module or that the first alert module controller 70 can be integrated with the controller of an air conditioning appliance without departing from the scope of the present invention. An air conditioning appliance may include any one of an air conditioner, a heat pump, hot water heater, a steam pump, a hot water boiler, the geothermal system, or the like.

DETAILED DESCRIPTION OF THE PREFERRED EMBODIMENTS

Figure 1:
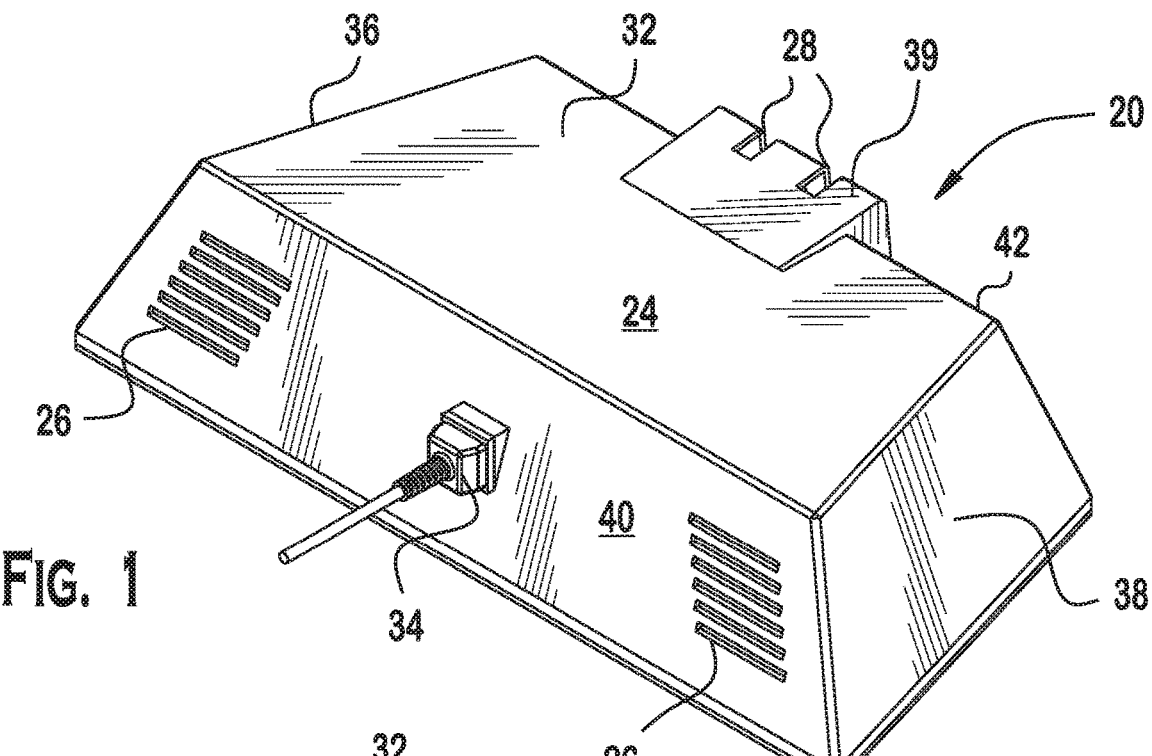
FIG. 1 is a perspective view of a preferred embodiment of a first alert module 20 according to a preferred embodiment of the present invention. It is preferred that the first alert module 20 has a module housing 24 with a top 32 that is generally trapezoidal shaped. The module housing 24 preferably includes first and second axial end panels 36, 38 and first and second longitudinal side panels 40, 42. The base 30 of the longitudinal housing preferably has a larger trapezoidal shape than the top 24. The first longitudinal side panel 40 preferably includes multiple lateral vents 26 and power connector 34. The second longitudinal side panel 42 preferably includes a rectilinear protrusion 39 having generally vertical slots 28 therethrough. Those of ordinary skill in the art will appreciate from this disclosure that the housing 24 of the first alert module 20 can be varied without departing from the scope of the present invention.
Figure 2:
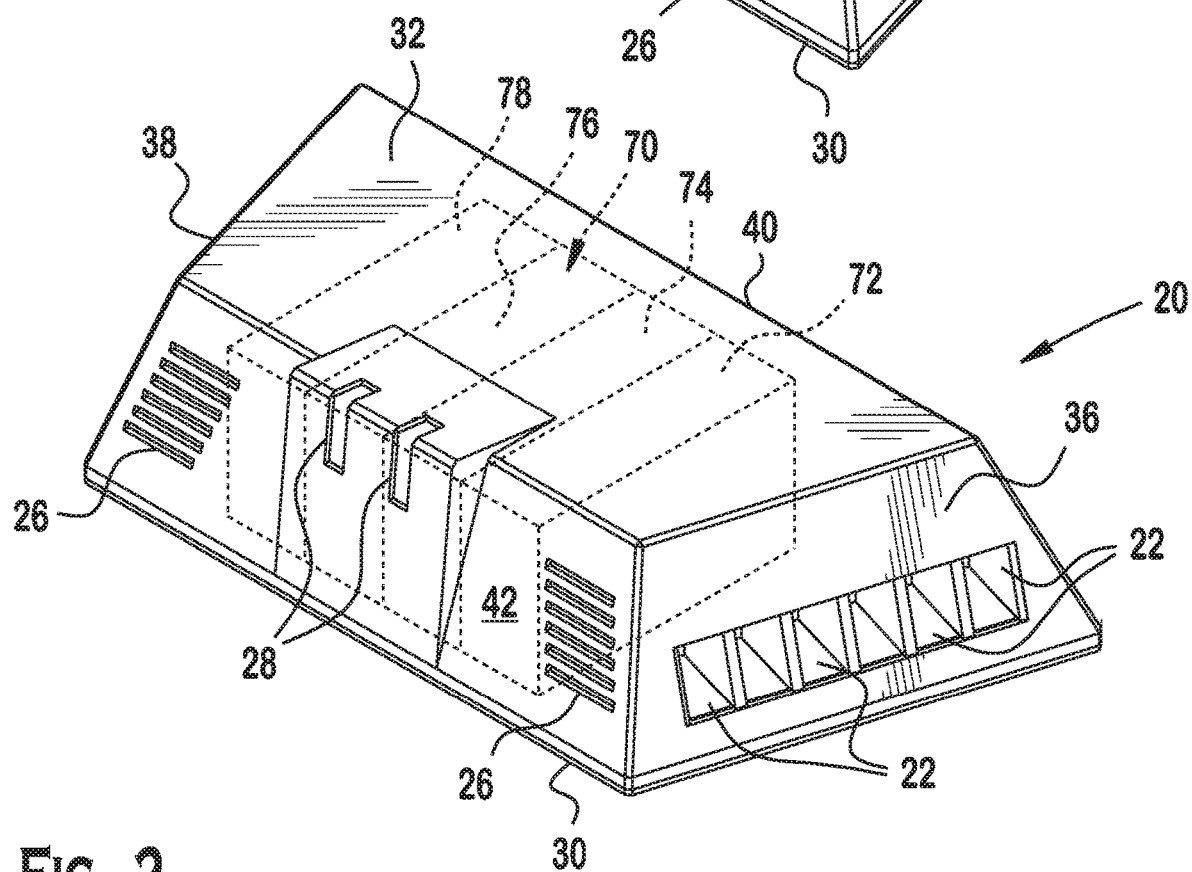

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the air-conditioning appliance 50 and/or first alert module 20 and designated parts thereof. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Referring to FIGS. 1-15C, wherein like numerals indicate like elements throughout, there is shown a preferred embodiment of an air-conditioning appliance 50 having a safety feature. The safety feature may be provided by a first alert module 20 which can be an add-on component to the air-conditioning appliance 50. Alternatively, the controller of the air-conditioning appliance 50 may include the safety feature directly. The first alert module 20 preferably detects an undesirable condition. An undesirable condition may be any one of detecting a leak indicating a leak or overflow condition, detecting a low temperature indicating a freezing risk for the pipes or conduits, and/or detecting carbon monoxide in air ducts 96 or detecting carbon monoxide above a predetermined level in a flue 110. The first alert module 20 makes it possible for affected persons to immediately identify the problem and, when appropriate, bypass or override an automatic shut off of the air-conditioning appliance 50.

An air conditioning system having an advanced safety feature is shown in FIGS. 3-6. The air conditioning system preferably includes a housing 51. Those of ordinary skill in the art will appreciate from this disclosure that the air-conditioning system 50 may include multiple components each having its own housing. For example, the air-conditioning system 50 may be a heat pump having a condenser 52 and an air handler 87.

In this instance, the air conditioning appliance 50 is a heat pump. Air handler 87 is positioned inside a building/house 89. The building 89 has a lower floor 82 and an upper floor 83. The lower floor 82 adjoins a wall 84 and is supported by footer 48. A drain 44 may be located proximate to the air conditioning appliance 50 and in the floor 82. A drain pipe 46 removes any liquid from the drain 44. This heat pump preferably includes a condenser 52 positioned outside and an air handler 87 positioned inside the building 89. The condenser 52 preferably includes fan blades 54 powered by a fan motor 56 and operated by the control box 58. The condenser 52 is preferably located on a base 60. The air handler 87 preferably includes a blower 86, a heater 88, and a chiller 104.

The heat pump preferably includes a control box 118. Although the control box 118 is shown as separate from the air handler housing, those of ordinary skill in the art will appreciate from this disclosure that the control box can be incorporated therein. The first alert module 20 is shown as being located on and/or in the control box 118. Those of ordinary skill in the art will appreciate from this disclosure that the first alert module 20 and its associated components may be integrated directly into any controller that is installed within the air handler 87 or can be retrofitted later without departing from the scope of the present invention. Cooling coils 106 are located in the chiller 104 and are also in fluid communication with the condenser 52 and contain refrigerant therein.

A sensor 116 is preferably located on the cooling coils 106 to detect when freezing may be imminent (such as when the refrigerant is approximately 38° F. or the like). The sensor 116 is connected to the first alert module 20. Additionally, the heater 88 may be connected to a flue 110. A carbon monoxide sensor 108 may be located in the flue 110 to determine one an unsafe amount of carbon monoxide is present. A second carbon monoxide sensor 112 is preferably positioned in the airstream 80 in duct 96. Sensor 112 preferably detects the presence of carbon monoxide in the airstream 80 prior to the air and during living quarters of the event 100. The thermostat 64 is preferably in communication with the control box 118. A gas pipe 102 may be in connection with the heater 88. A drainpipe 92 preferably forms of P-trap 94 and extends from the air handler 87.

The P-trap 94 preferably collects debris prior to discharge from the lower end of the drainpipe 92 and provides a visual indication of lack of water in the P-trap 94 which indicates that the drainpipe 92 is probably clogged at its connection point to the air handler 87. Second-floor 98 is preferably supported by joists 66. Air preferably returns to the air handler 87 via return duct 90; is driven by a blower/recirculating fan 86 over either the a heater 88 or a chiller 104 and then discharged into duct 96 for distribution throughout a building.

It is preferred, but not necessary, that the air handler 87 include an evaporator which may be formed by cooling coils 104. The evaporator is preferably configured to extract heat from surrounding air. The heat pump preferably includes a condenser 52 configured to convert vapor to liquid, a compressor configured to increase the pressure of a gas, and a refrigerant circulating through the air conditioning system.

Figure 3:
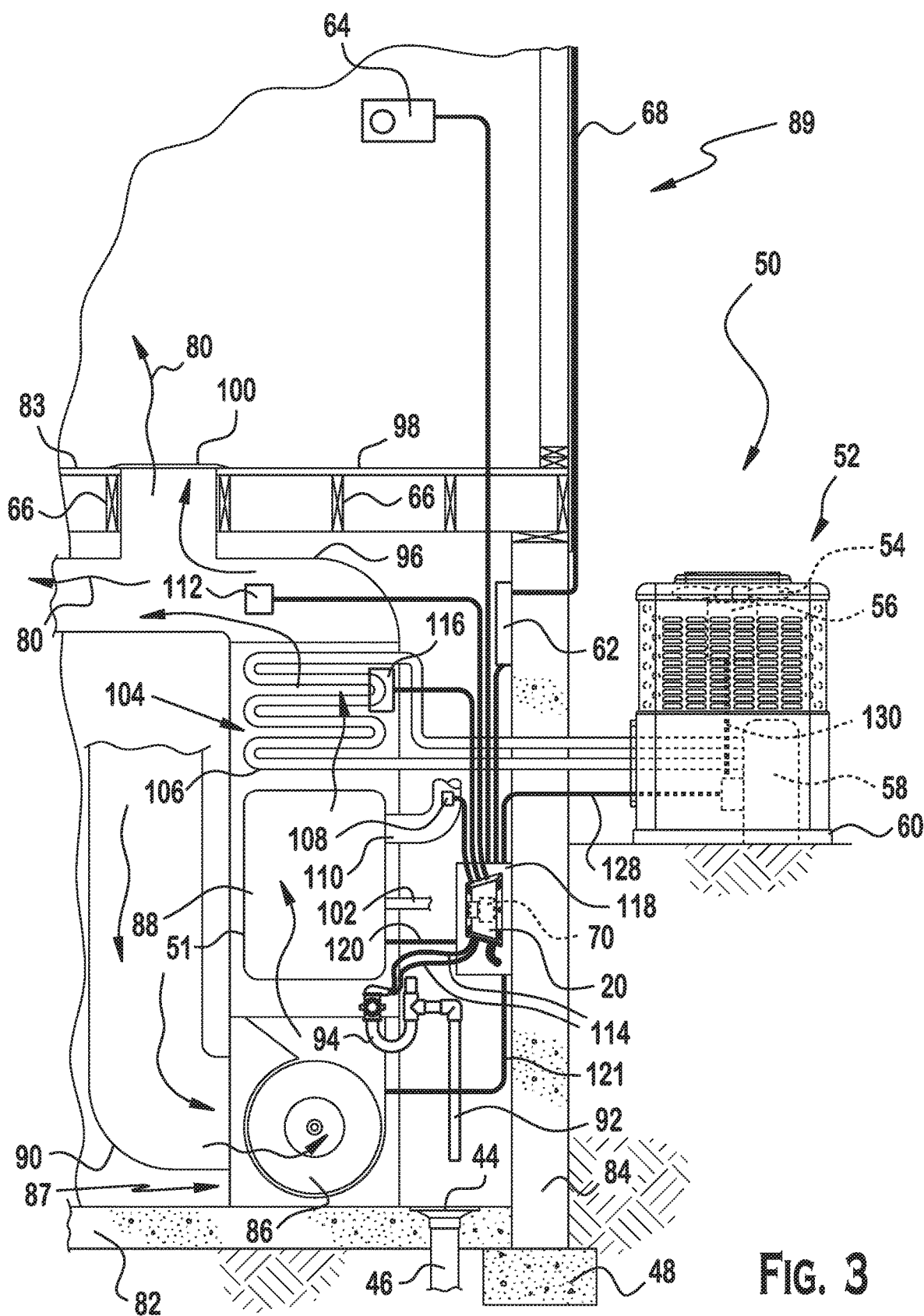
FIG. 3 is a broken away schematic view of an air conditioning appliance 50. In this instance, the air conditioning appliance 50 is a heat pump. Air handler 87 is positioned inside a building/house 89. The building 89 has a lower floor 82 and an upper floor 83. The lower floor 82 adjoins a wall 84 and is supported by footer 48. A drain 44 may be located proximate to the air conditioning appliance 50 and in the floor 82. A drain pipe 46 removes any liquid from the drain 44. This heat pump preferably includes a condenser 52 positioned outside and an air handler 87 positioned inside the building 89. The condenser 52 preferably includes fan blades 54 powered by a fan motor 56 and operated by the control box 58. The condenser 52 is preferably located on a base 60. The air handler 87 preferably includes a blower 86, a heater 88, and a chiller 104. The heat pump preferably includes a control box 118. Although the control box 118 is shown as separate from the air handler housing, those of ordinary skill in the art will appreciate from this disclosure that the control box can be incorporated therein. The first alert module 20 is shown as being located on and/or in the control box 118. Those of ordinary skill in the art will appreciate from this disclosure that the first alert module 20 and its associated components may be integrated directly into any controller that is installed within the air handler 87 or can be retrofitted later without departing from the scope of the present invention. Cooling coils 106 are located in the chiller 104 and are also in fluid communication with the condenser 52 and contain refrigerant therein. A sensor 116 is preferably located on the cooling coils 106 to detect when freezing may be imminent (such as when the refrigerant is approximately 38° F. or the like). The sensor 116 is connected to the first alert module 20. Additionally, the heater 88 may be connected to a flue 110. A carbon monoxide sensor 108 may be located in the flue 110 to determine one an unsafe amount of carbon monoxide is present. A second carbon monoxide sensor 112 is preferably positioned in the airstream 80 in duct 96. Sensor 112 preferably detects the presence of carbon monoxide in the airstream 80 prior to the air and during living quarters of the event 100. The thermostat 64 is preferably in communication with the control box 118. A gas pipe 102 may be in connection with the heater 88. A drainpipe 92 preferably forms of P-trap 94 and extends from the air handler 87. The P-trap 94 preferably collects debris prior to discharge from the lower end of the drainpipe 92 and provides a visual indication of lack of water in the P-trap 94 which indicates that the drainpipe 92 is probably clogged at its connection point to the air handler 87. Second-floor 98 is preferably supported by joists 66. Air preferably returns to the air handler 87 via return duct 90; is driven by a blower/recirculating fan 86 over either the a heater 88 or a chiller 104 and then discharged into duct 96 for distribution throughout a building.

It is preferred, but not necessary, that at least one of a drain pan 122 is positioned under the air conditioning housing and a P-Trap 94 is formed by a drain pipe 92 extending from the air conditioning housing 51. Referring specifically to FIG. 3, the P-trap 94 allows visual identification of a problem in the drain line 92.

Figure 4:
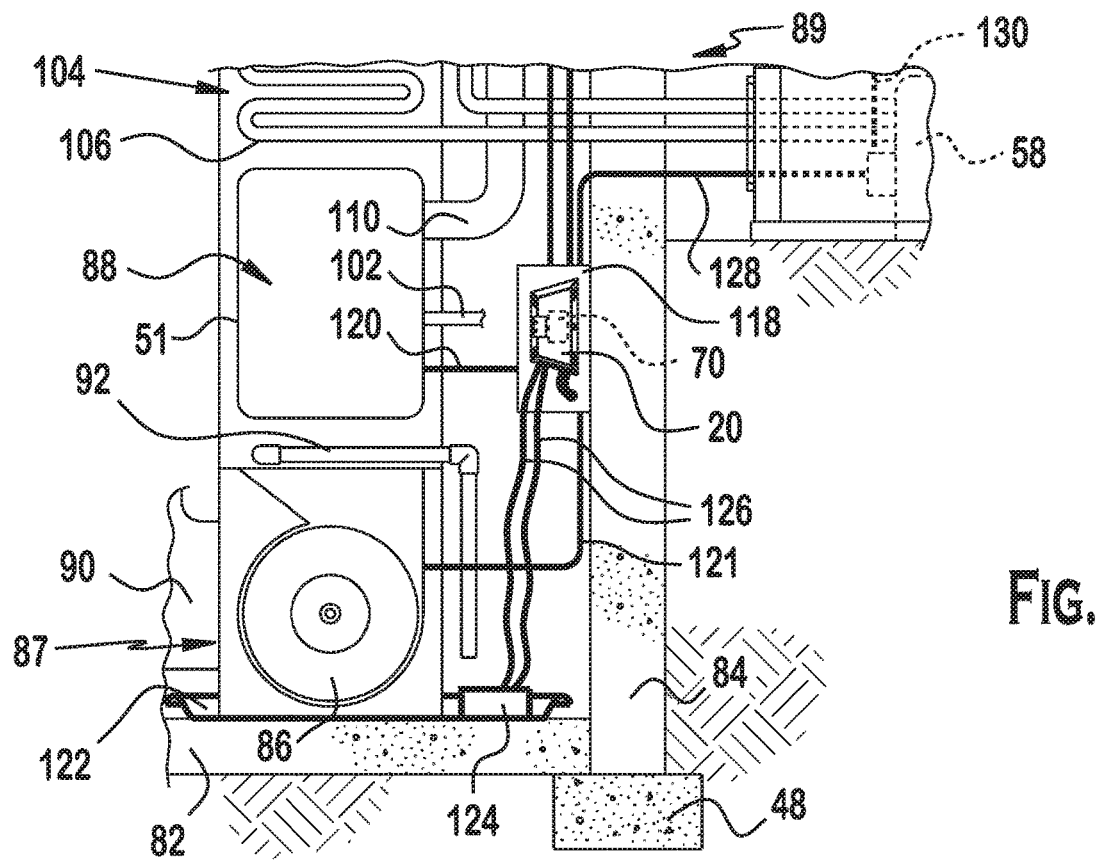
FIG. 4 is a broken away partial view of a heat pump having an air handler 87 positioned in a drain pan 122 with the wet sensor 124 positioned in the drain pan 122. The drainpipe 92 is shown without a P-trap 94, but may be included without departing from the scope of the present invention. Leads 126 connect controller 70 of the first alert module 20 to the sensor 124. As mentioned above, the controller 70 of the first alert module 20 can be directly integrated and/or manufactured with the heat pump (or other air handling appliance 50) without departing from the scope of the present invention. A power line 120 preferably connects the heater 88 to the control box 118. Similarly, power line 121 preferably connects the control box 118 to the blower 86.
Figure 5:
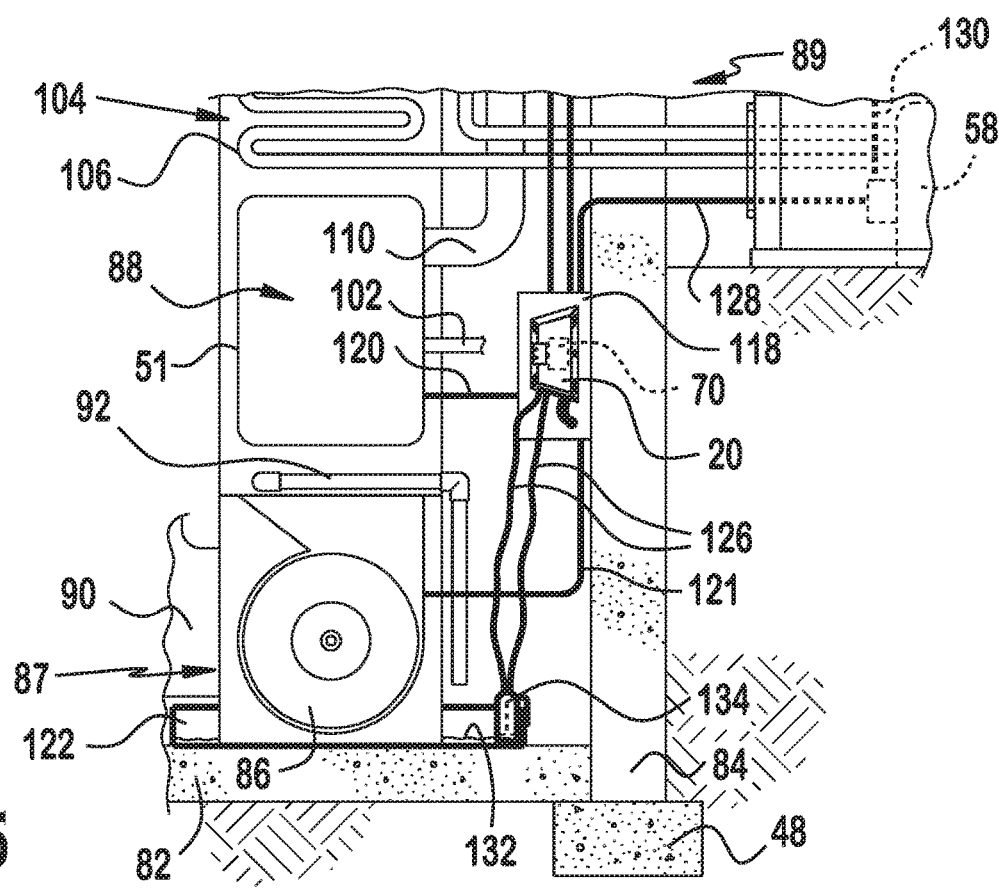
FIG. 5 is a broken away partial view of an air conditioning appliance 50 (preferably a heat pump) in which the air handler 87 is positioned in a drain pan 122 with a float sensor 134 therein for detecting the presence of water 132 in the pan 122. The float sensor is preferably connected to at least one of the control box 118 and/or the controller 70 in the first alert module 20 via leads 126. The air conditioning appliance 50 preferably includes: an air conditioner housing 87 which preferably encompasses the air handler; and evaporator (also referred to as cooling coils 104) which is configured to extract heat from surrounding air; a condenser configured to convert vapor the liquid which is located in a compressor 52 configured to increase the pressure of a gas; and preferably includes a refrigerant circulating through the air-conditioning appliance. A sensor 134, 124 is preferably positioned in at least one of a drain pan 122 and the drainpipe 92. The sensor 124, 134 is preferably configured to detect liquid.

Referring specifically to FIG. 4, in one embodiment, the air conditioning system includes both the drain pan 122 under the air conditioning housing 51 and the P-Trap 94 formed by the drain pipe 92 extending from the air conditioning unit 51. The sensor 124, 132 can be disposed on the drain pan 122 and a second sensor can be disposed on the drain pipe 92.

The controller is preferably in communication with the second sensor 117, 124, or 132. Additionally, the controller can use a temperature sensor 116 and/or carbon monoxide sensors 108, 112 to detect other undesirable conditions. For example, the presence of carbon monoxide in an air duct 96 would be an undesirable condition. Similarly, the presence of carbon monoxide above a predetermined level in the flue 110 would be an undesirable condition.

The first alert module controller 70 preferably includes an alert module 72, a bypass message module 74, and operation termination module 76, and an override message module 78. Those of ordinary skill in the art will appreciate from this disclosure that the multiple modules can be combined into a single module or that the first alert module controller 70 can be integrated with the controller of an air conditioning appliance without departing from the scope of the present invention.

The alert module 72 is preferably configured to send an alert if a sensor detects liquid indicating an overflow or flood condition. A sensor 124, 134, 136 is preferably disposed in at least one of the drain pan 122 and the drain pipe 92. The sensor is preferably configured to detect liquid 132. Furthermore the alert module 72 may send multiple subsequent alerts at a given interval, such as once daily, or every 12 hours or the like.

The controller 70 may be in communication with any one of the sensors and the air conditioning system 50. The controller preferably, but not necessarily, includes an alert module configured to send an alert if the sensor detects an undesirable condition (such as liquid). It is preferred that the alert is at least one of a text message, a voice call, an email, and an audio alert through a wireless speaker. It is preferred that the controller 70 be in communication with a relay shield 146 (which may be incorporated therein). It is preferred that the controller include an operation termination module (further described below) which is configured to send a termination signal to the relay shield 146 which then opens a relay switch to a six, 208, 210, 212 thereon to break power to the air conditioning system 50.

The controller 70 preferably includes a bypass message module 74 configured to receive a bypass message after the alert is generated prior to the controller 70 stopping operation of the air conditioning system 50. The controller 70 preferably also includes an operation termination module 76 configured to stop operation of the air conditioning system 50 if, after generating the alert, the bypass message module 74 does not receive the bypass message within a predetermined amount of time and the sensor still detects the liquid (or other undesirable condition).

While for some users it is important to stop operation of the air conditioning system 50 as soon as an undesirable condition, such as a leak or flood, is detected, for some people it may be critical to maintain operation of the air conditioning system due to health reasons. Additionally, in many cases a leak may be detected that will not turn into a problem for a number of days so by promptly identifying the leak is possible to operate the air-conditioning system with reduced risk if prompt arrangements for service are made. For people with a health condition that requires constant operation of the air-conditioning system, the trade-off between continued operation and the existence of a minor leak for a limited period of time can be worthwhile. However, for those that do not wish to operate the air-conditioning system for any length of time after an undesirable condition is detected, the predetermined amount of time can be set to equal zero such that operation of the air conditioning system stops simultaneously with sending the alert.

The controller 70 preferably includes an override message module 78 configured to restart operation of the air conditioning system 50 after the operation termination module 76 has stopped operation of the air conditioning system when an override message is received. Those of ordinary skill in the art will appreciate that each module of the controller 70 can be on an independent circuit board or that a single circuit board can perform all of the functions of the modules. FIGS. 10-12, 15A, 15B, and 15C illustrate exemplary schematics and/or circuit diagrams that can be used to form the controller 70. Those of ordinary skill in the art will appreciate that the present invention is not limited to the illustrated schematics and/or circuit diagrams. Additionally, those of ordinary skill in the art will appreciate that the controller 70 and its associated circuitry and components can be integrated with the air-conditioning system controller.

The controller 70 preferably also monitors the health of the first alert module 20 and/or the air conditioning appliance 50. The controller 70 preferably detects when the amount of power and/or current drawn by the first alert module 20 and/or the air conditioning appliance 50 is outside of a predetermined range or changes too fast for normal operation. Once a condition is detected that may indicate the health of the first alert module 20 and/or the air conditioning appliance 50 may be compromised, a pre configured notification can be sent. The notification may be sent by the alert module using any of the communication methods used for sending alerts.

The controller 70 preferably also monitors the first alert module 20 and/or the air conditioning appliance 50 for loss of communications with a remote server, radio tower, cell tower, or computer network. The controller 70 preferably detects when communication is lost by the first alert module 20 and/or the air conditioning appliance 50 a pre configured notification can be sent. The notification may be sent by the alert module using any of the communication methods used for sending alerts.

The controller 70 preferably also monitors the first alert module 20 and/or the air conditioning appliance 50 for loss of communications with a sensor. The controller 70 preferably detects when communication is lost by the first alert module 20 and/or the air conditioning appliance 50 and a pre configured notification can be sent. The notification may be sent by the alert module using any of the communication methods used for sending alerts.

Referring to FIG. 1, in some embodiments, the air-conditioning system 50 includes a carbon monoxide sensor 112 in at least one ventilation duct 96 in fluid communication with the air conditioning system 50. The carbon monoxide sensor 112 is adapted to detect a carbon monoxide level of air in the at least one ventilation duct. The controller 70 is in communication with the carbon monoxide sensor 116 and the alert module 72 is preferably configured to send an alert if the carbon monoxide sensor detects the presence of carbon monoxide. In some embodiments, the alert may include the amount of carbon monoxide detected. Additionally, a carbon monoxide sensor 108 can be located in a flue 110 attached to the heater 88 in the air-conditioning system. The alert module 72 preferably sends an alert when the amount of carbon monoxide exceeds a predetermined level of carbon monoxide in the air being discharged from the heater.

It is preferred that the controller 70 is integrated into an air-conditioning appliance 50 that is a heat pump or air conditioning system. However, those of ordinary skill in the art will appreciate from this disclosure that the air-conditioning appliance may be any one of an air conditioner such as a heat pump (illustrated in FIGS. 3-6), a hot water heater (shown in FIG. 7), a steam pump, a hot water boiler, and the geothermal system or the like.

In another preferred embodiment, the controller 70 of the present invention can be integrated into a first alert module 20 that is configured to be retrofit to an existing air-conditioning appliance 50. The first alert module 20 is preferably configured to alert a user of an undesirable condition in and/or caused by and/or related to an air-conditioning appliance.

Figure 6:
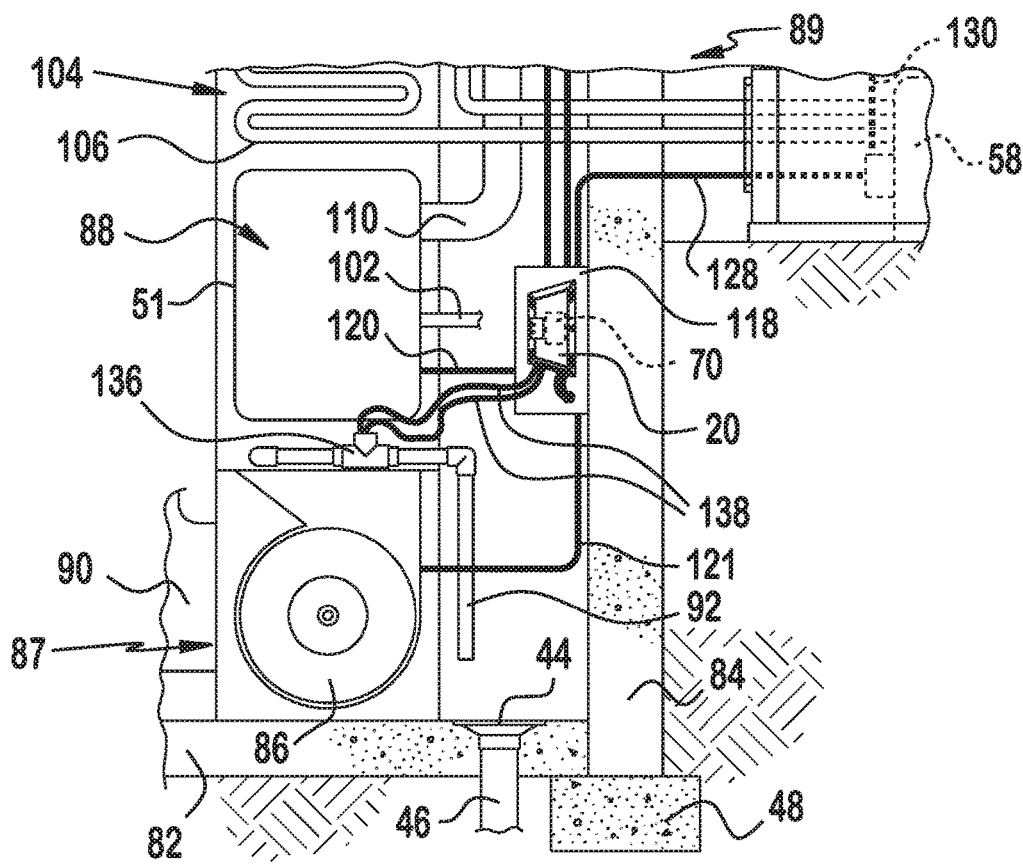
FIG. 6 is broken away partial view of an air conditioning appliance having a sensor and safety switch 136 located in line in the drainpipe 92. The controller 70 is preferably in communication with the sensor 136, 124, 134 and the air-conditioning appliance 50. The controller preferably includes an alert module 72 which is configured to send alert if the sensor detects the liquid. The alert is preferably at least one of a text message, a voice call, an email, and an audio alert through a wireless speaker. The controller preferably also includes a bypass message module 74 which is configured to receive a bypass message after the alert is generated prior to the controller 70 stopping operation of the air-conditioning appliance 50. The controller 70 preferably includes an operation termination module 76 configured to stop operation of the air-conditioning system if, after generating the alert, the bypass message module 76 does not receive the bypass message within a predetermined amount of time and if the sensor still detects the liquid. The controller 70 preferably also includes an override message module 78 which is configured to restart the air-conditioning appliance when an override message is received after the operation termination module has stopped the operation of the air-conditioning appliance 50. The controller 70 and the modules thereon can be separate or integrated into a single module without departing from the scope of the present invention.
Figure 7:
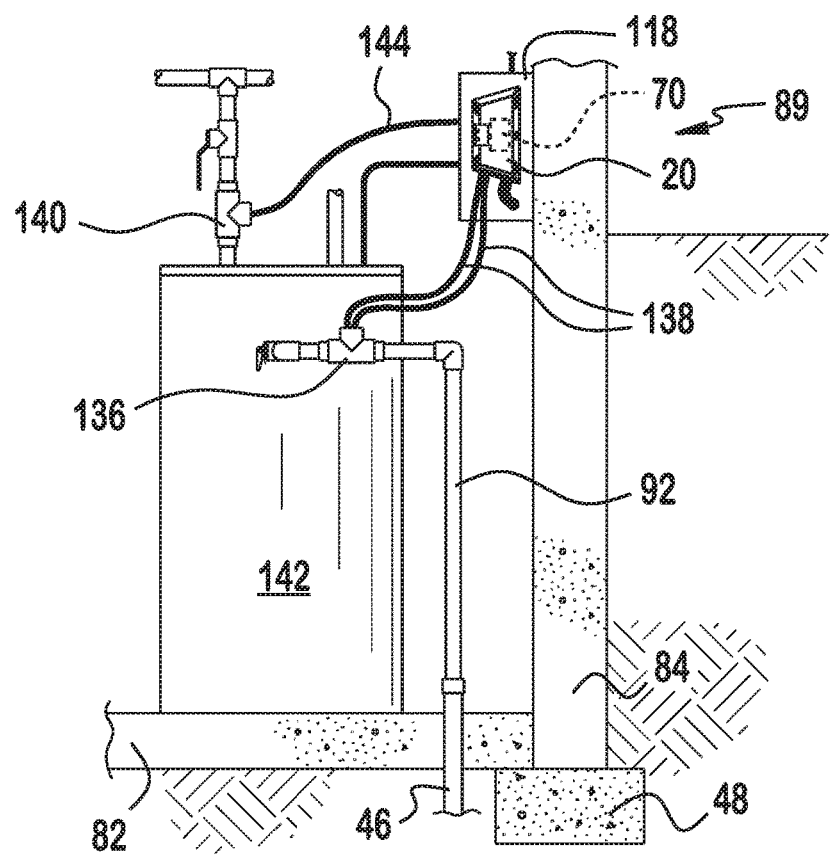
FIG. 7 is a broken away partial view of an air conditioner appliance, in this case a hot water heater 142, that is integrated and/or in communication with controller 70 which may be positioned in a first alert module 20, a control box 118, or integrated into the hot water heater 142 directly. The controller 70 is connected via a lead 144 to shut off valve 142 allow the controller 70 to stop the flow of water to the hot water heater 142 and is also preferably wired to the heating elements of the hot water heater 142 so that the controller 70 can stop the supply of water to the hot water heater 142 and turn off its power. An in-line sensor 136 is preferably connected via leads 138 to the controller 70. The sensor 136 is preferably located in drainpipe 92. The air-conditioning appliance 50 can be any one of an air conditioner, a heat pump, a hot water heater, a steam pub, a hot water boiler, hot water heater, a geothermal system, or the like without departing from the scope of the present invention.
Figure 8:
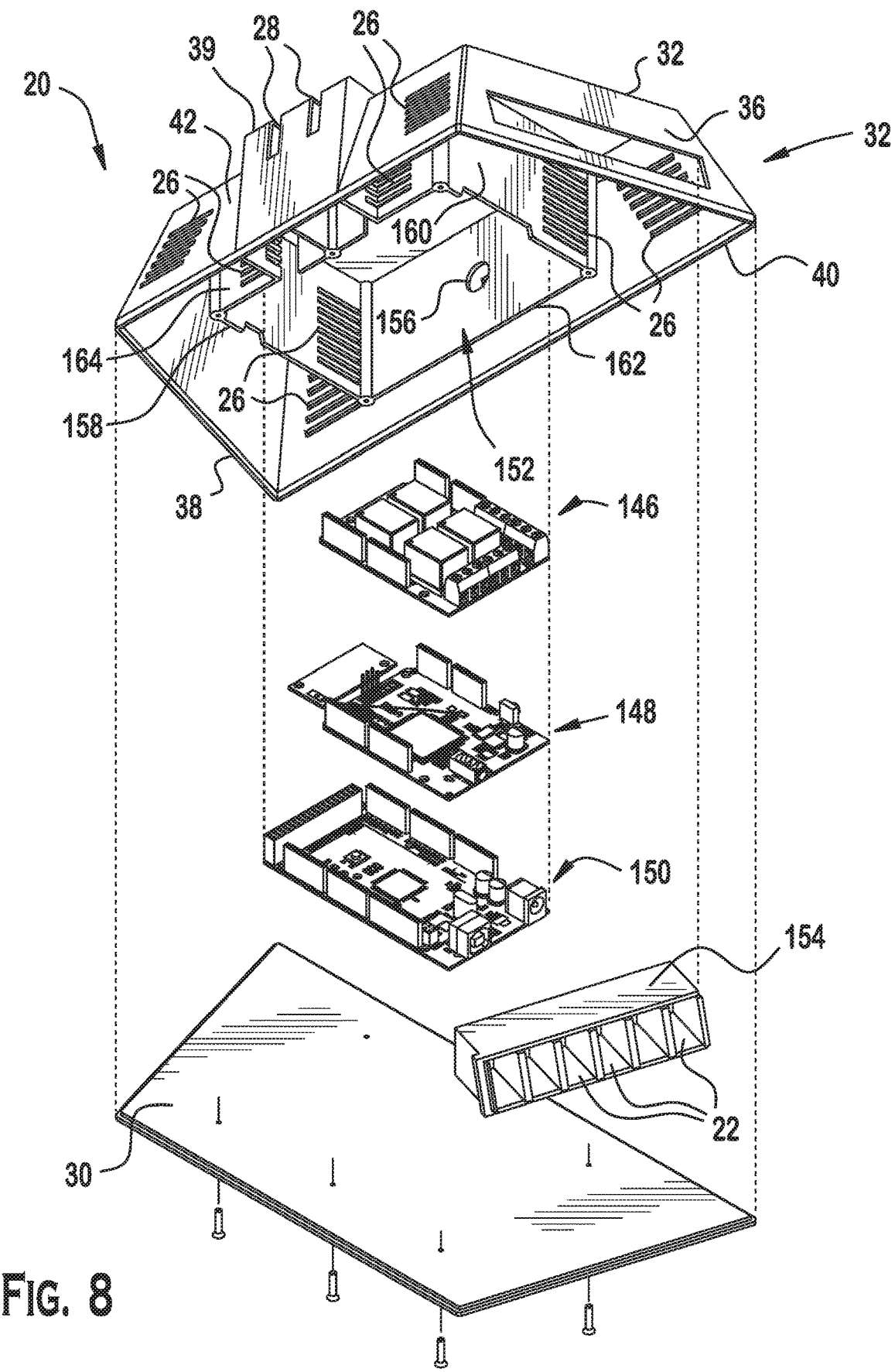
FIG. 8 is an exploded view of first alert module 20 showing one preferred arrangement of electronics used to form controller 70, which may include, relay shield 146, GPRS board 148, and Arduino board 150. Those of ordinary skill in the art will appreciate from this disclosure that any combination of electronic components and/or programming may be used to form the controller 70 and its related modules without departing from the scope of the present invention. The inner housing 152 located within module housing 24 of the first alert module 20 preferably includes a first side 158, second side 160, third side 162, and a fourth side 164. Those of ordinary skill in the art will appreciate from this disclosure that the housing 20 may be of any configuration without departing from the scope of the present invention.
Figure 9:
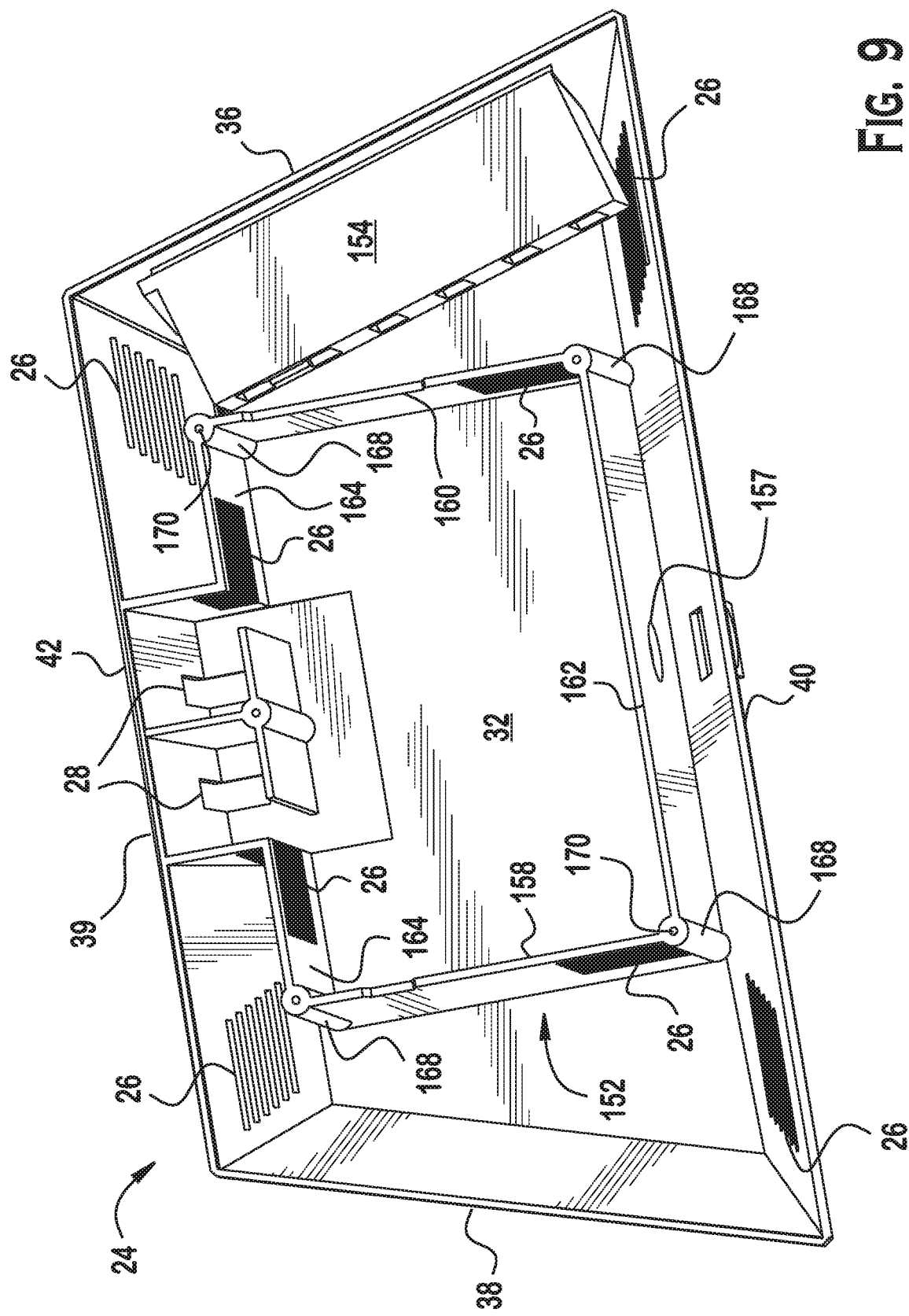
FIG. 9 is a bottom plan view of the housing 24 of the first alert module 20 with the base removed. Posts 168 are preferably positioned at the intersection of the first through fourth inner side walls 158, 160, 162, 164 of the inner housing 152. Bores 170 are preferably located in the posts 168 to receive fasteners that secure the base 30 (not shown) thereto. Port housing 154 is preferably attached to an inner surface of the first axial end panel 36 of the housing 24.
Figure 10:
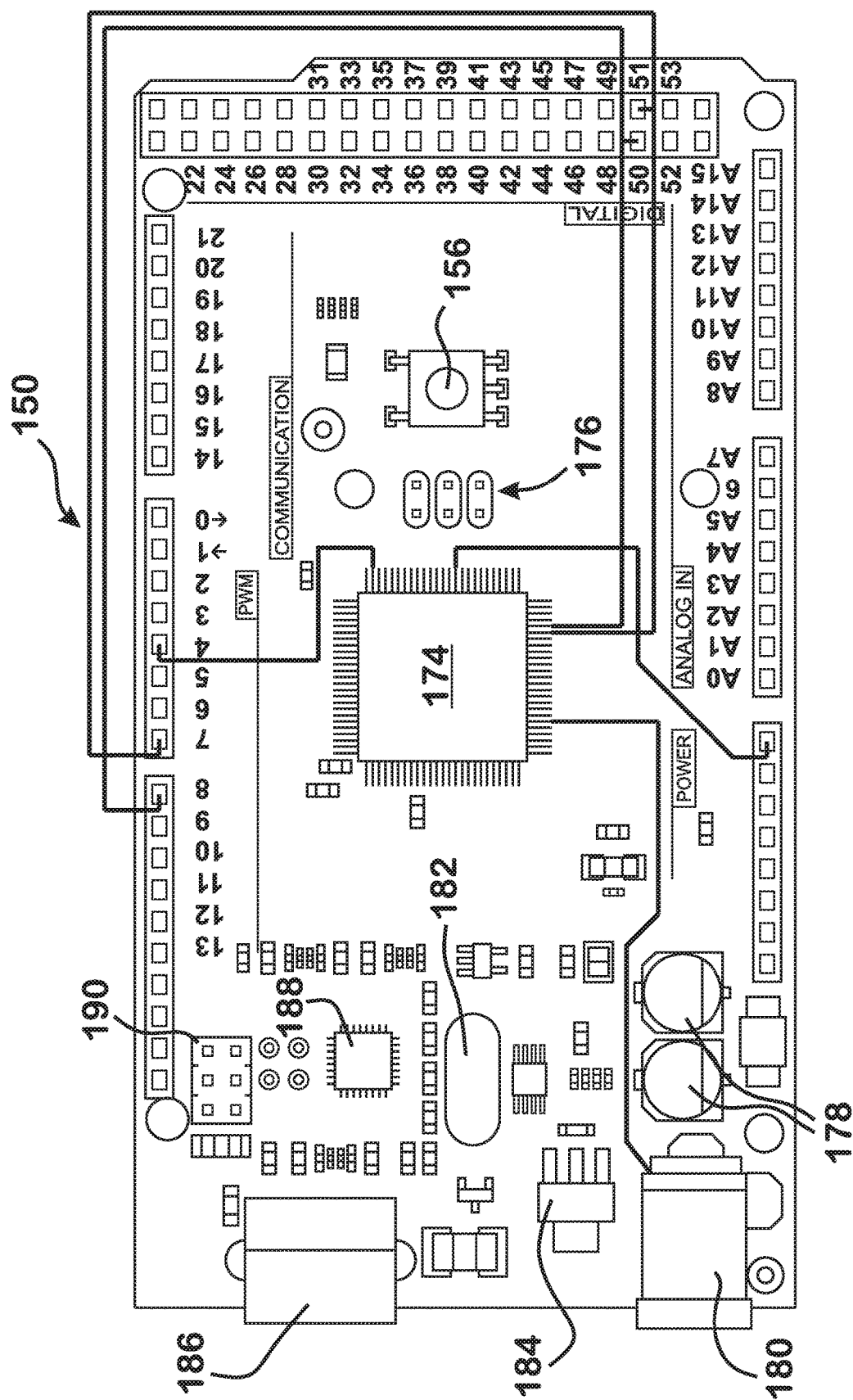
FIG. 10 is one preferred schematic of the Arduino board 150. The board 150 preferably, but not necessarily, includes a CPU 174, ICSP 176, reset button 156, aluminum electrolytic capacitors 178, a 5 V regulator 184, a crystal oscillator 182, an Atmel mega 16L2 188, a USB interface 186, and ICSP for 16U2 190. Those of ordinary skill in the art will appreciate from this disclosure that any suitable schematic can be used and that the present invention is not limited to the illustrated schematic.
Figure 11:
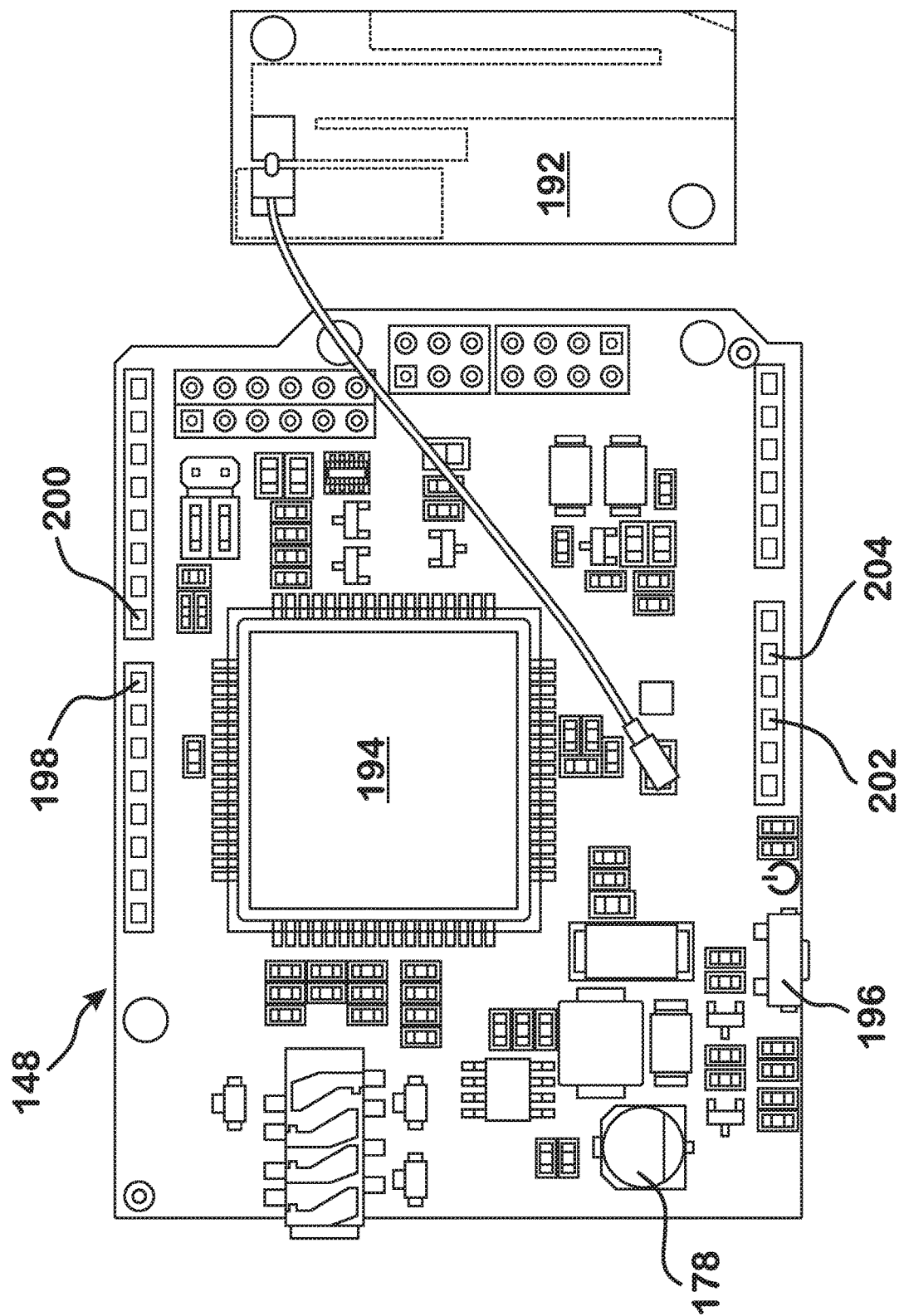
FIG. 11 is one preferred schematic of the GPRS 148. The GPRS 148 preferably, but not necessarily, includes antenna 192, power and ground connectors 202, 204, a power button 196, aluminum electrolytic capacitors 178, a Sim 900 CPU 194, and a TX and RX connector 198, 200. Those of ordinary skill in the art will appreciate from this disclosure that any suitable schematic can be used and that the present invention is not limited to the illustrated schematic.
Figure 12:
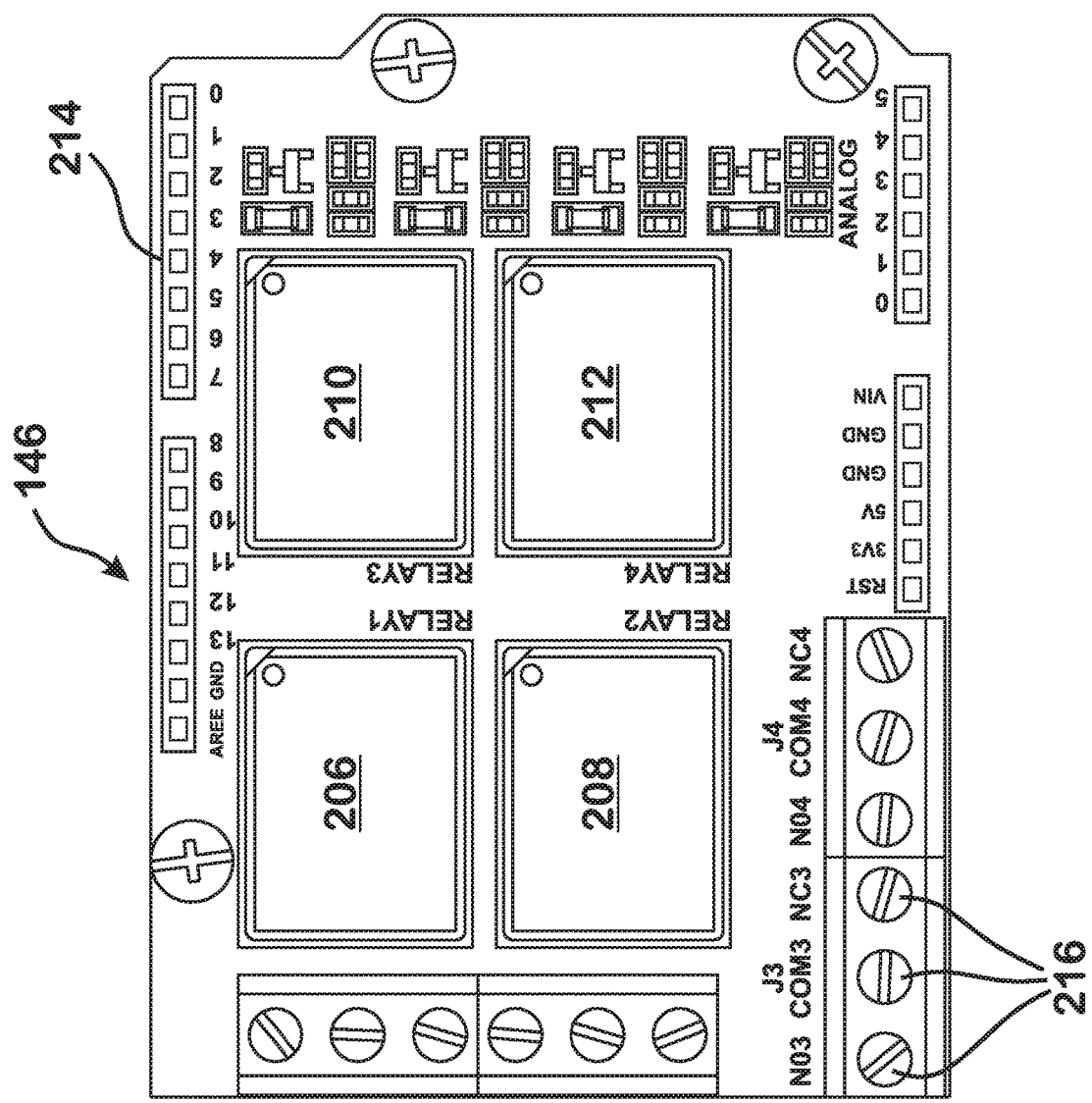
FIG. 12 is one preferred schematic of a relay shield of the present invention. The relay shield 146 preferably, but not necessarily, includes: first through fourth relays (any combination of normally open or normally closed relays) to a six, 208, 210, 212, primary relays to 16, and controls J3 to 14. Those of ordinary skill in the art will appreciate from this disclosure that any suitable schematic can be used and that the present invention is not limited to the illustrated schematic.
Figure 13:
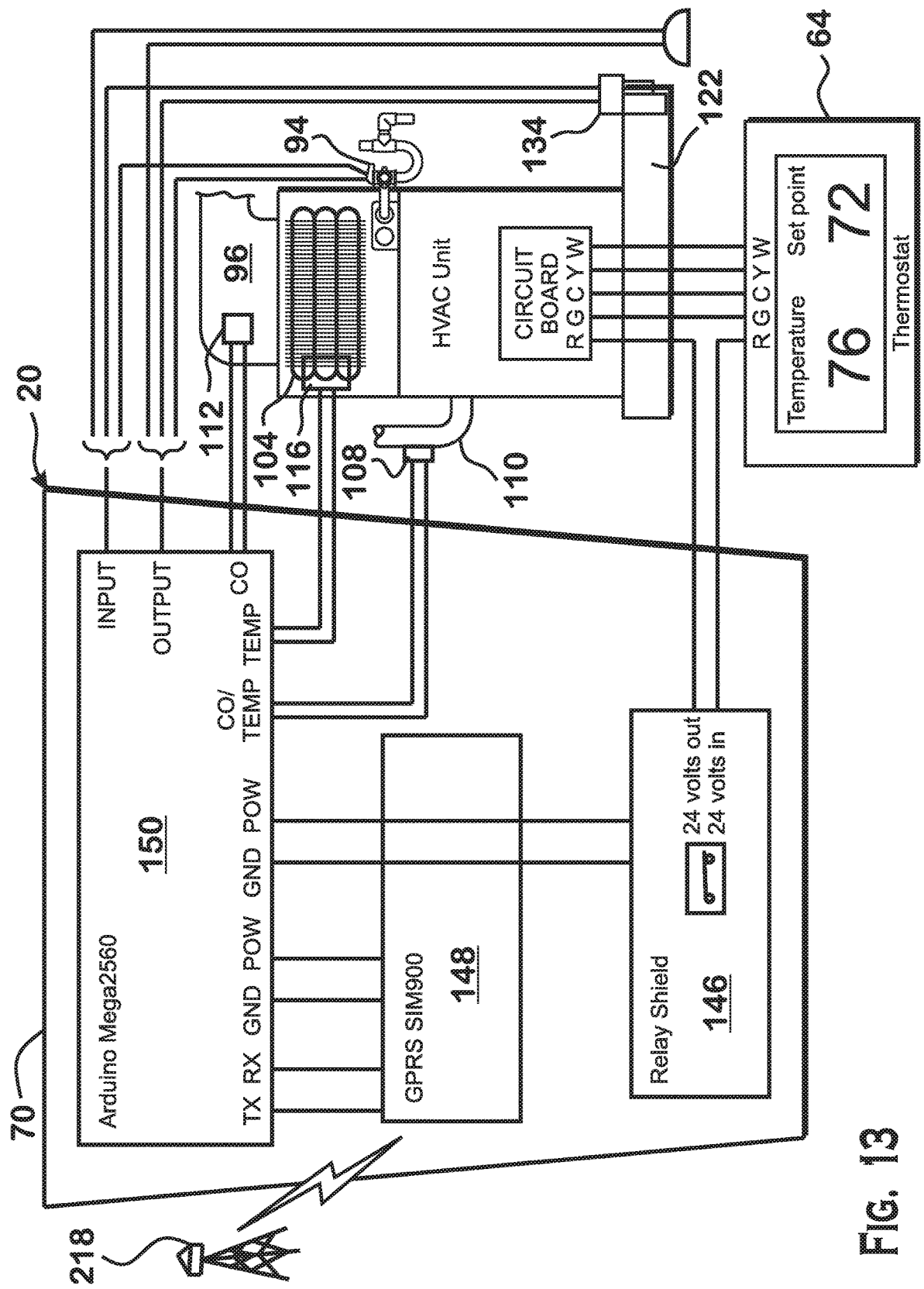
FIG. 13 is a schematic illustrating communication between a controller 70, an Internet/radio/cell/GPS tower 218, and air-conditioning appliance such as an HVAC unit, and a thermostat 64.
Figure 14:
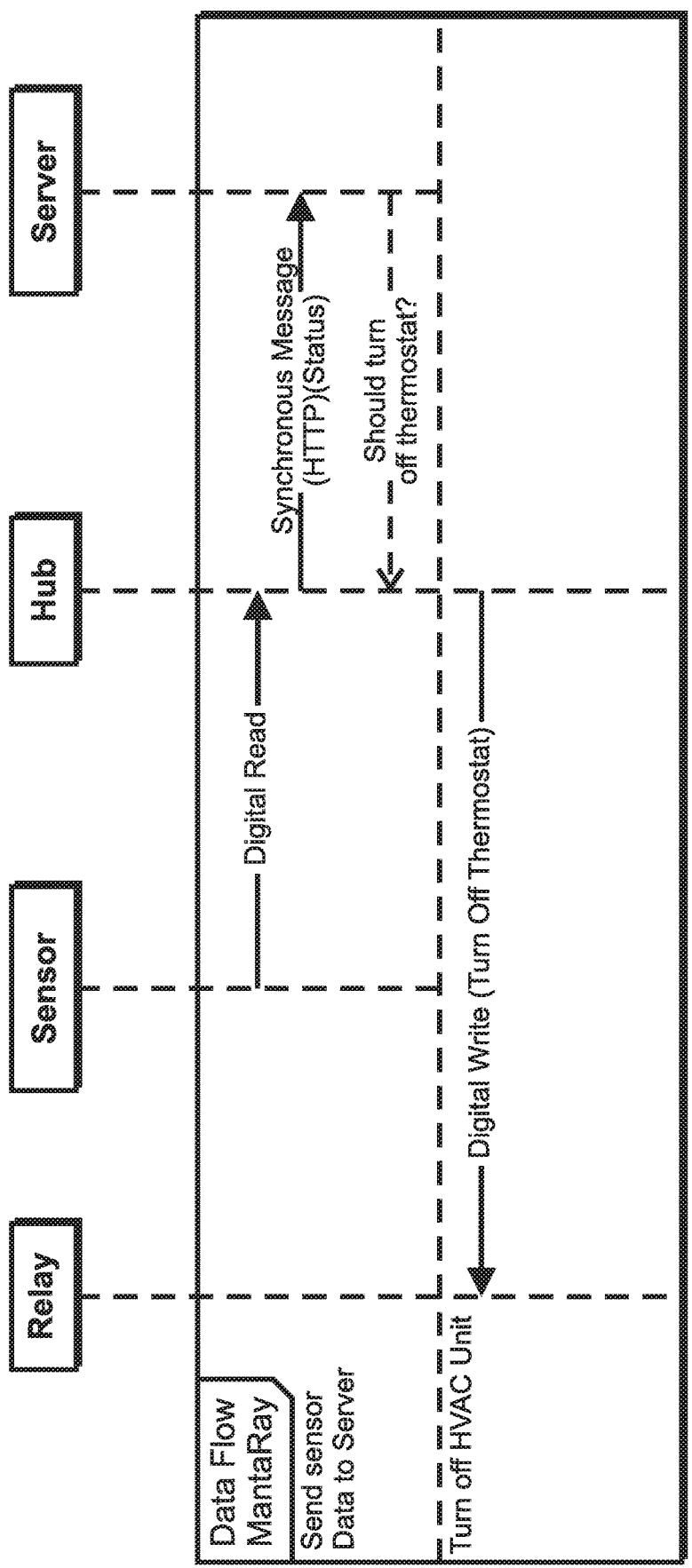
FIG. 14 illustrates data flow between the controller 70 (also referred to as the Manta Ray), the sensor, a hub (such as the tower 218 shown in FIG. 13 or a local controller positioned in the air-conditioning appliance), and a server.
Figure 15A:
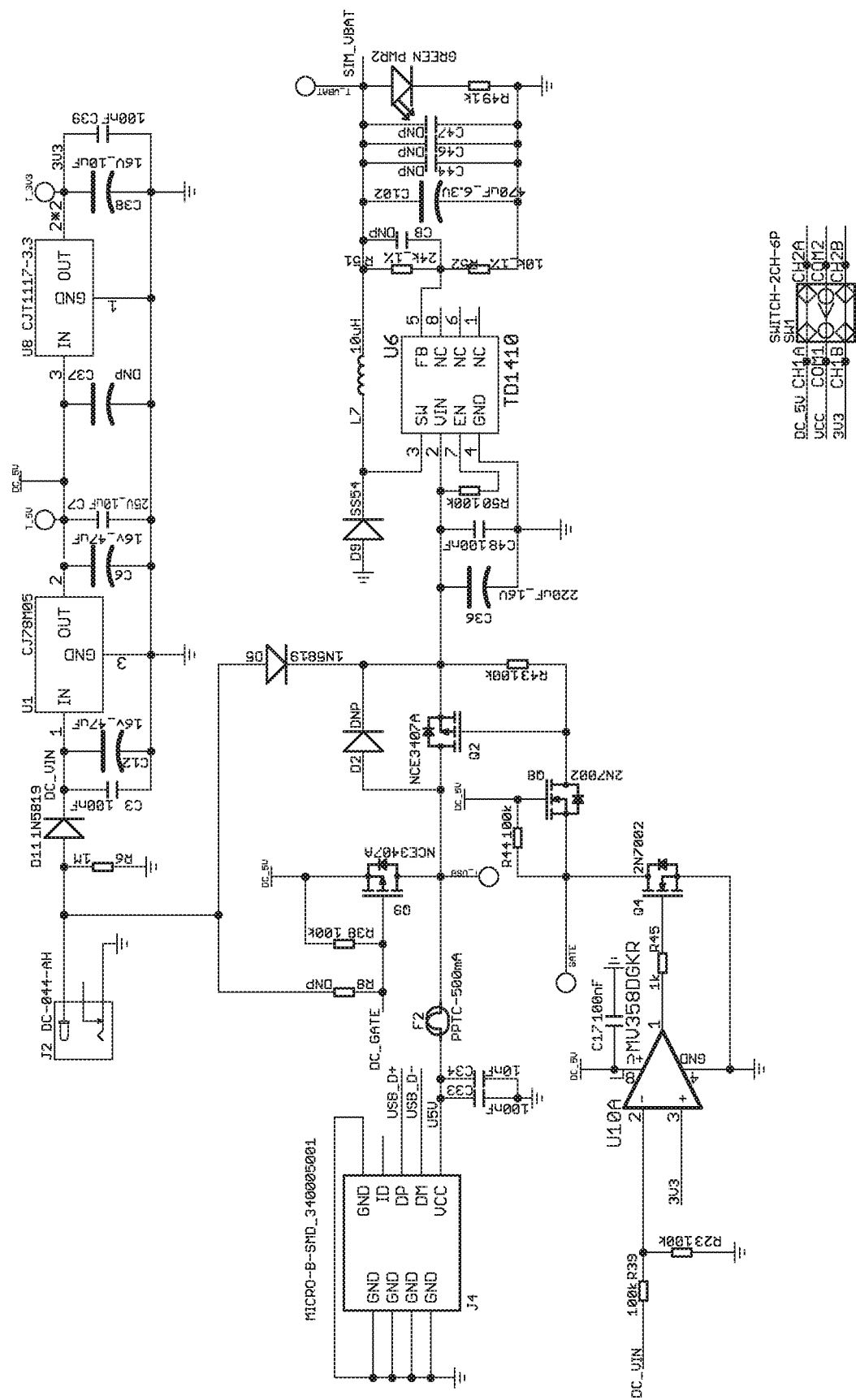
FIG. 15A illustrates a first of five parts of a preferred circuit diagram for the GPRS which may be integrated into controller 70. Those of ordinary skill in the art will appreciate from this disclosure that any suitable circuitry can be used and that the present invention is not limited to the illustrated circuit diagram.
Figure 15B:
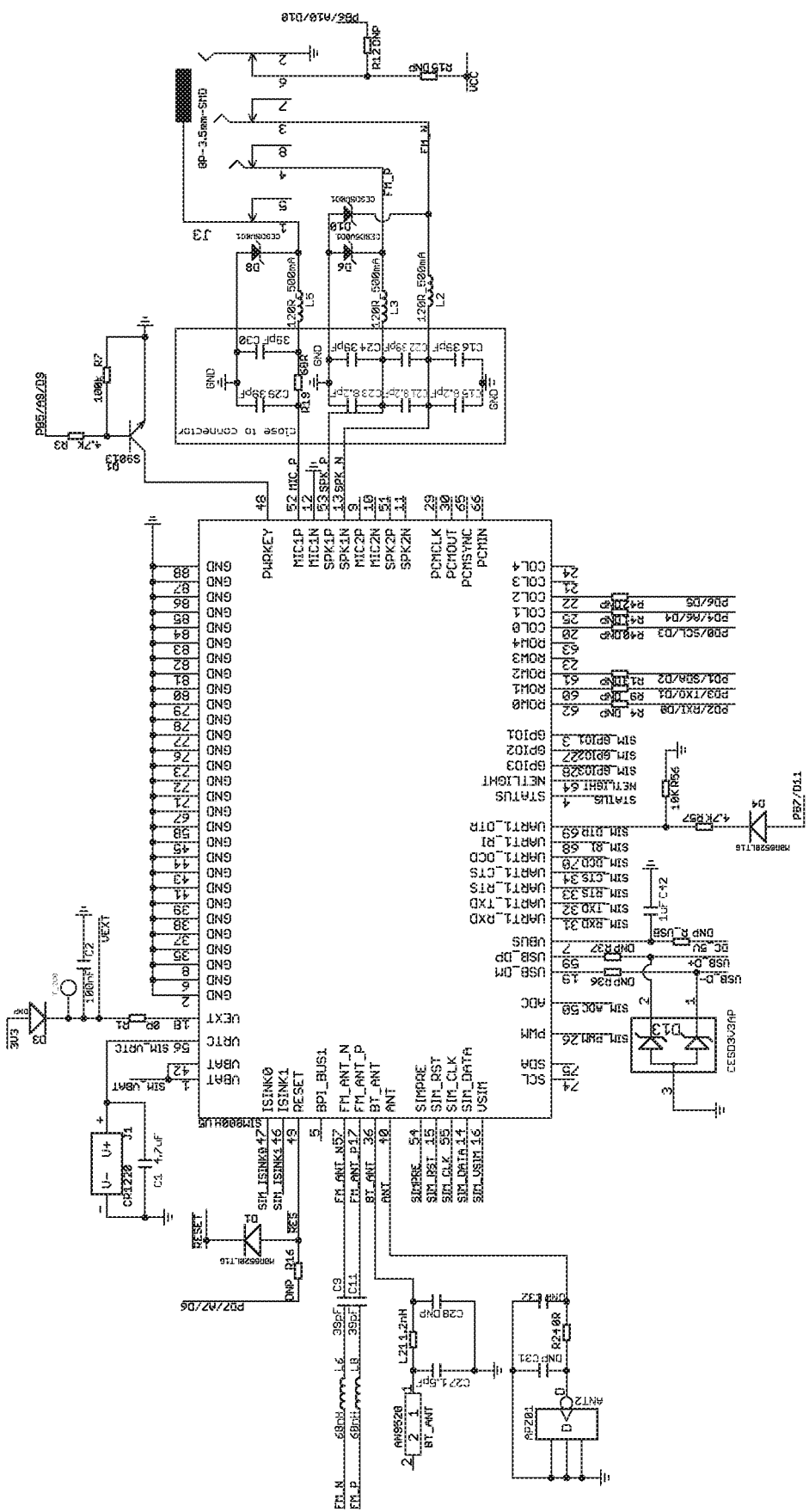
FIG. 15B illustrates a second of five parts of a preferred circuit diagram for the GPRS which may be integrated into controller 70. Those of ordinary skill in the art will appreciate from this disclosure that any suitable circuitry can be used and that the present invention is not limited to the illustrated circuit diagram.
Figure 15C:
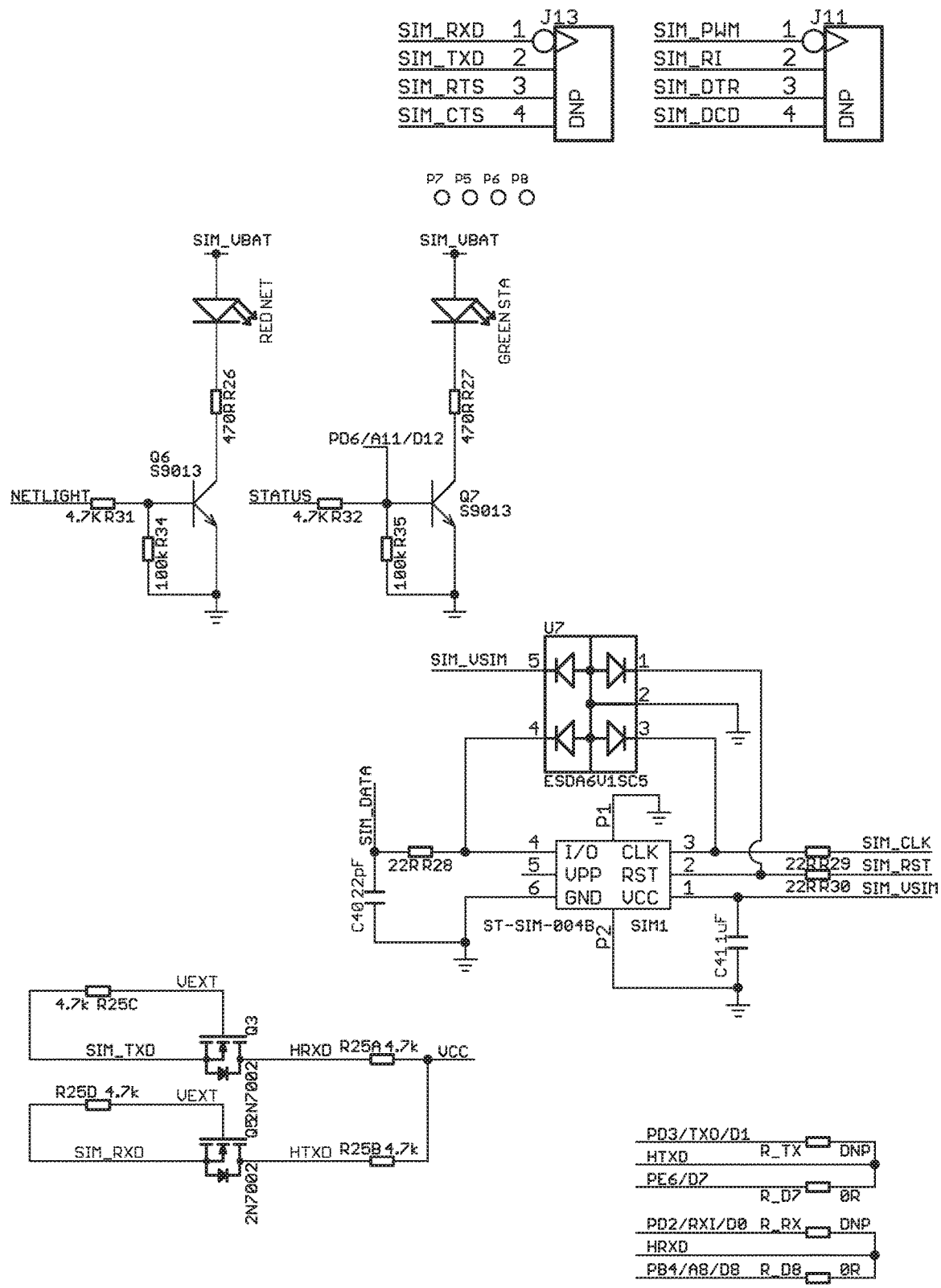
FIG. 15C illustrates a third of five parts of a preferred circuit diagram for the GPRS which may be integrated into controller 70. Those of ordinary skill in the art will appreciate from this disclosure that any suitable circuitry can be used and that the present invention is not limited to the illustrated circuit diagram.
Figure 15D:
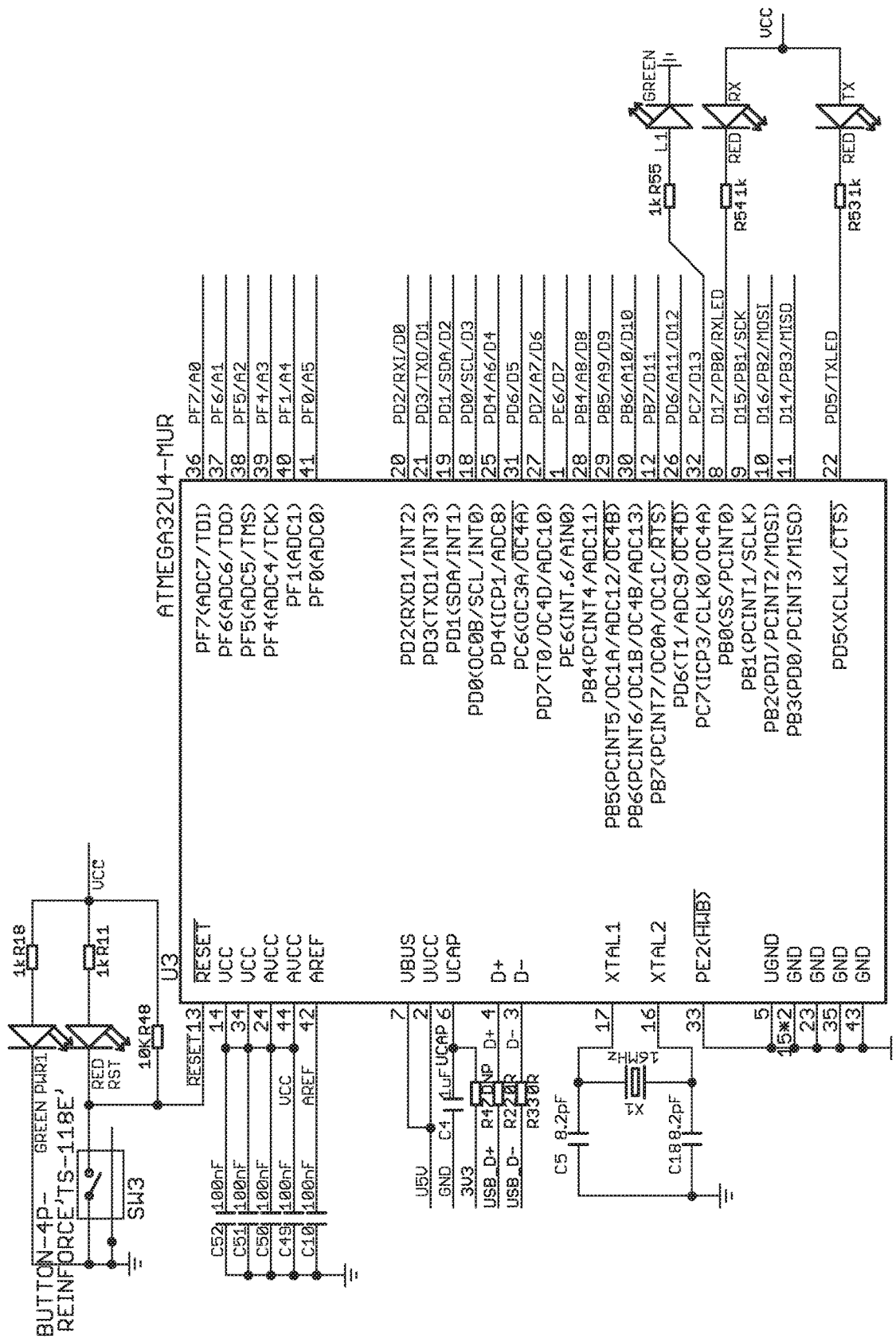
FIG. 15D illustrates a fourth of five parts of a preferred circuit diagram for the GPRS which may be integrated into controller 70. Those of ordinary skill in the art will appreciate from this disclosure that any suitable circuitry can be used and that the present invention is not limited to the illustrated circuit diagram.
Figure 15E:
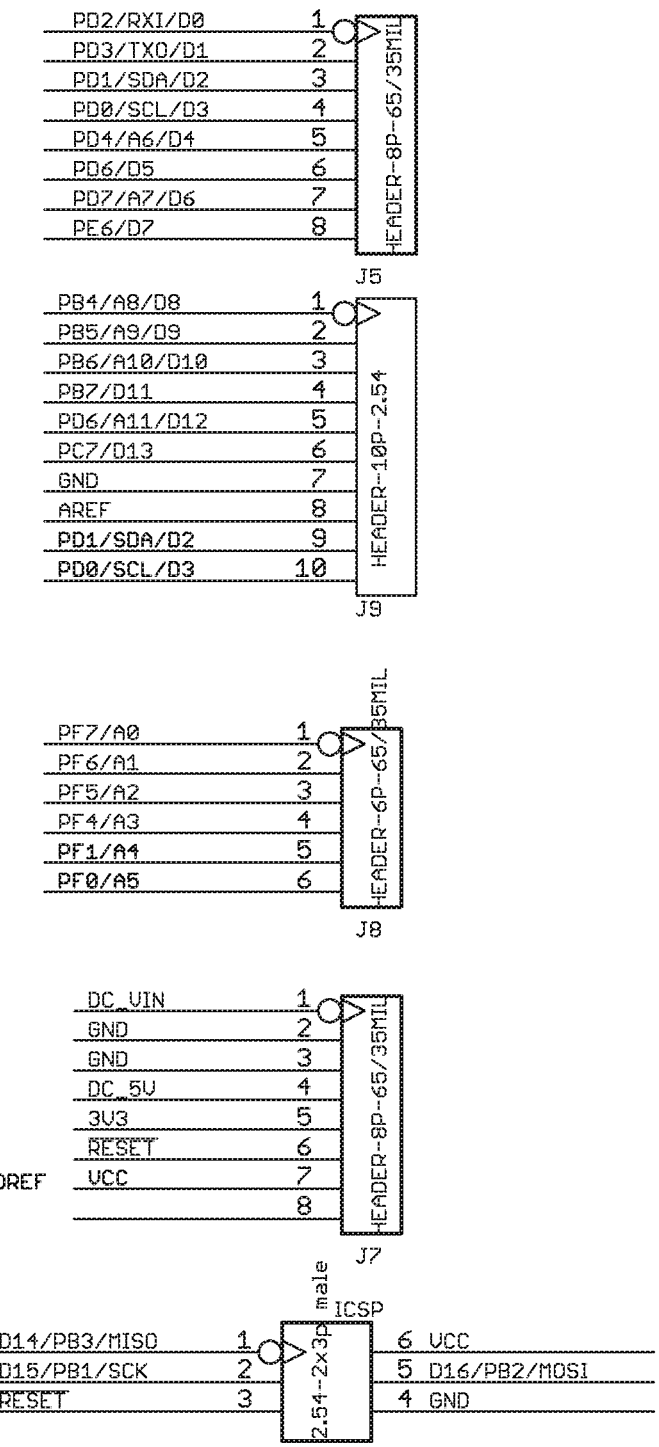
FIG. 15E illustrates a fifth of five parts of a preferred circuit diagram for the GPRS which may be integrated into controller 70. Those of ordinary skill in the art will appreciate from this disclosure that any suitable circuitry can be used and that the present invention is not limited to the illustrated circuit diagram.

Examples of just some of the undesirable conditions that can be detected by the first alert module 20 (or by the controller 70 being integrated directly into the air-conditioning appliance) using one or more sensors are as follows. Referring to FIG. 1, a sensor 117 can be positioned in a P-trap 94 to detect and overflow condition. A temperature sensor 116 can be used to determine when cooling coils 106 may freeze due to low temperatures. Carbon monoxide sensors 108, 112 may be used to detect carbon monoxide above a predetermined amount in various locations throughout the air-conditioning appliance 50 and surrounding areas. Referring to FIG. 4, a sensor 124 can determine the presence of liquid in a drain pan 122. Similarly, referring to FIG. 5, a sensor 134 can be a float switch located in the drain pan 122. Referring to FIG. 6, an in-line sensor 136 can be used to determine and overflow condition in the air handler 87. Similarly, an in-line sensor 136 can be used to detect the malfunction of a hot water heater 142. Those of ordinary skill in the art will appreciate from this disclosure that additional undesirable conditions can be monitored by the first alert module 20 without departing from the scope of the present invention.

The first alert module 20 preferably has a module housing 24 enclosing the module controller 70. The module housing 24 is preferably configured for attachment to an exterior of the housing 51 of the air conditioning appliance 50.

A preferred implementation of the preferred method of the present invention will be described below (alone or in combination with various embodiments of the first alert module 20). The steps of the method of the present invention can be performed in any order, omitted, or combined without departing from the scope of the present invention. As such, optional or required steps described in conjunction with one implementation of the method can also be used with another implementation or omitted altogether. Additionally, unless otherwise stated, similar structure or functions described in conjunction with the below method preferably, but not necessarily, operate in a generally similar manner to that described elsewhere in this application.

One preferred method of the present invention is directed to providing an air conditioning system with a safety feature including the step of providing the air conditioning system 50. The method preferably includes the step of the user selecting a type of alert to be sent. The type of alert that a user can choose from should be at least one of the text message, the voice call, the email, and the audio alert through the wireless speaker. In one preferred embodiment of the present invention a user is able to pick any one of all of the above alert options. That is, in one preferred embodiment of the present invention, the alert module offers a user each of the following options for sending an alert: a text message, the voice call, the email, and the audio alert through the wireless speaker.

The method of the present invention may include the step of configuring the air conditioning unit 50 to include both of the drain pan 122 thereunder and the P-Trap 94 formed by the drain pipe 92 extending from the air conditioning unit 50. The sensor is preferably disposed on the drain pan. A second sensor may be provided on the drain pipe. The controller is preferably in communication with all sensors positioned within the air-conditioning appliance 50 and the surrounding areas.

The method of the present invention preferably also includes providing a ventilation duct 96 in fluid communication with the air conditioning system 50 and positioning a carbon monoxide sensor 112 within the ventilation duct 96. The carbon monoxide sensor 112 is preferably adapted to detect a carbon monoxide level of an air 80 in the at least one ventilation duct 96. The controller is preferably in communication with the carbon monoxide sensor 112.

The method of the present invention preferably also includes sending a carbon monoxide alert by the alert module 72 if the carbon monoxide sensor 112 detects a predetermined level of carbon monoxide in the air of the at least one ventilation duct, wherein the carbon monoxide alert is at least one of a text message, a voice call, an email, and an audio alert through a wireless speaker. The method also preferably includes monitoring by the bypass message module 74 and the override message module 78 for receipt of at least one of a carbon monoxide bypass message and a carbon monoxide override message after generation of the carbon monoxide alert.

The method of the present invention preferably also includes stopping operation of the air conditioning system 50 by the operation termination module 76 if the carbon monoxide sensor 112 continues to detect that the carbon monoxide level of the air is equal to or greater than the predetermined level and the carbon monoxide bypass message is not received within a predetermined amount of time after the carbon monoxide sensor 112 first detects that the carbon monoxide level of the air 80 is equal to or greater than the predetermined level.

The method of the present invention preferably also includes the step of stopping operation of the air conditioning system simultaneously with sending the carbon monoxide alert. The step of monitoring by the controller 70 may include the bypass message being a code that the user provides to the bypass message module 74 via at least one of a text message and an email.

The method of the present invention preferably also includes providing the code for the bypass message on a portion of the at least one of the drain pan and the drain pipe. It is preferred that the controller is in communication with at least one of a server, cell tower, Wi-Fi network, etc.

The method of the present invention preferably also includes, after stopping operation of the air conditioning unit, monitoring by the override message module 78 for receipt of the override message. The controller 70 is configured to resume operation of the air conditioning system 50 upon receiving the override message.

It is recognized by those skilled in the art that changes may be made to the above described methods and/or air conditioning appliance 50 and/or first alert module 20 without departing from the broad inventive concept thereof. It is understood, therefore, that this invention is not limited to the particular embodiments disclosed, but is intended cover all modifications which are within the spirit and scope of the invention as defined by the above specification, the appended claims and/or shown in the attached drawings.

What is claimed is:

1. A method of providing an air conditioning system with a safety feature, comprising:
    providing an air conditioning system having an advanced safety feature, comprising:
        an air conditioning housing;
        an evaporator configured to extract heat from surrounding air;
        a condenser configured to convert vapor to liquid;
        a compressor configured to increase the pressure of a gas;
        a refrigerant circulating through the air conditioning system;
        at least one of a drain pan positioned under the air conditioning housing and a P-Trap formed by a drain pipe extending from the air conditioning housing;
        a sensor disposed in at least one of the drain pan and the drain pipe, the sensor being configured to detect liquid;
        a controller in communication with the sensor and the air conditioning system, the controller further comprising:
            an alert module configured to send an alert if the sensor detects the liquid, wherein the alert is at least one of a text message, a voice call, an email, and an audio alert through a wireless speaker;
            a bypass message module configured to receive a bypass message after the alert is generated prior to the controller stopping operation of the air conditioning system;
            an operation termination module configured to stop operation of the air conditioning system if, after generating the alert, the bypass message module does not receive the bypass message within a predetermined amount of time and if the sensor still detects the liquid; and
            an override message module configured to restart operation of the air conditioning system after the operation termination module has stopped operation of the air conditioning system when an override message is received;
    providing a ventilation duct in fluid communication with the air conditioning system;
    positioning a carbon monoxide sensor within the ventilation duct, the carbon monoxide sensor adapted to detect a carbon monoxide level of an air in the ventilation duct, and wherein the controller is in communication with the carbon monoxide sensor;
    the user selecting a type of alert to be sent, the type of alert being the at least one of the text message, the voice call, the email, and the audio alert through the wireless speaker;
    sending a carbon monoxide alert by the alert module if the carbon monoxide sensor detects a predetermined level of carbon monoxide in the air of the ventilation duct, wherein the carbon monoxide alert is the at least one of a text message, a voice call, an email, and an audio alert through a wireless speaker;
    monitoring by the bypass message module and the override message module for receipt of at least one of a carbon monoxide bypass message and a carbon monoxide override message after generation of the carbon monoxide alert; and
    stopping operation of the air conditioning system by the operation termination module if the carbon monoxide sensor continues to detect that the carbon monoxide level of the air is equal to or greater than the predetermined level and the carbon monoxide bypass message is not received within a predetermined amount of time after the carbon monoxide sensor first detects that the carbon monoxide level of the air is equal to or greater than the predetermined level.

2. The method of claim 1, wherein the step of providing an air conditioning system further comprises providing a relay shield, wherein the controller is in communication with the relay shield, and sending a termination signal to the relay shield which then opens a relay switch thereon to break power to the air conditioning system.

3. The method of claim 1, wherein the step of providing an air conditioning system further comprises the sensor being disposed on the drain pan, and providing a second sensor on the drain pipe, the controller being in communication with the second sensor, the alert module being configured to send an alert if the second sensor detects the liquid.

4. The method of claim 1, wherein the step of monitoring by the controller further comprises the bypass message being a code that the user provides to the bypass message module via at least one of a text message and an email.

5. The method of claim 4, further comprising the code which can be submitted to the bypass message module by the user and which is located on a portion of the at least one of the drain pan and the drain pipe.

6. The method of claim 1, wherein the step of providing the controller further comprises the controller communicating with at least one of a server.

7. The method of claim 1, wherein the sensor is a normally closed switch that is configured to open upon detecting the liquid.

8. The method of claim 1, further comprising the step of:
    after stopping operation of the air conditioning unit, monitoring by the override message module for receipt of the override message, wherein the controller is configured to resume operation of the air conditioning system upon receiving the override message.

* * * * *